United States Patent
Qi et al.

(10) Patent No.: US 12,317,295 B2
(45) Date of Patent: May 27, 2025

(54) ACCESS NETWORK SIGNALING AND RESOURCE ALLOCATION FOR MULTICAST/BROADCAST SESSIONS

(71) Applicant: ZTE Corporation, Shenzhen (CN)

(72) Inventors: Tao Qi, Shenzhen (CN); Lin Chen, Shenzhen (CN); Liping Wang, Shenzhen (CN); Hao Zhu, Shenzhen (CN); Kun Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 404 days.

(21) Appl. No.: 17/970,843

(22) Filed: Oct. 21, 2022

(65) Prior Publication Data
US 2023/0262734 A1 Aug. 17, 2023

Related U.S. Application Data

(63) Continuation of application No. PCT/CN2020/086630, filed on Apr. 24, 2020.

(51) Int. Cl.
*H04W 72/30* (2023.01)
*H04W 72/29* (2023.01)
*H04W 80/02* (2009.01)

(52) U.S. Cl.
CPC ............ *H04W 72/30* (2023.01); *H04W 72/29* (2023.01); *H04W 80/02* (2013.01)

(58) Field of Classification Search
CPC ..... H04W 72/30; H04W 72/29; H04W 80/02; H04W 88/085; H04W 4/06; H04W 4/20;
(Continued)

(56) References Cited

U.S. PATENT DOCUMENTS

2007/0117579 A1* 5/2007 Cai .................. H04W 72/30
455/3.06
2008/0101376 A1 5/2008 Do et al.
(Continued)

FOREIGN PATENT DOCUMENTS

CN 101742415 A 6/2010
CN 103249007 A 8/2013
(Continued)

OTHER PUBLICATIONS

Office Action dated Oct. 1, 2024 issued in corresponding Indian Patent Application No. 202217060011 w/translation (7 pages).
(Continued)

*Primary Examiner* — Huy C Ho
(74) *Attorney, Agent, or Firm* — Crowell & Moring LLP

(57) ABSTRACT

This disclosure describes an architecture for supporting MBS sessions in a wireless access network. Each of such MBS sessions is flexibly and dynamically delivered by the access network into one or more Point-To-Point (PTP, or unicast) and Point-To-Multipoint (PTM, or multicast) delivery instances. As such, a subset of the UEs participating in the MBS may be configured to receive the MBS session in a PTP-like manner and quality. The architecture further allows for access network level switching of one or more of the UEs participating in the MBS session between the PTP mode and PTM mode. Such switching are effectuated dynamically without involvement of application layer. The resource allocations and configuration for the PTP and PTM delivery instances may be performed in the access network collaboratively between a central unit (CU) and one or more distributed units (DUs). Such collaborative resource allocation and configuration may be effectuated using a novel architecture for the signaling messages between the CU and the DUs.

18 Claims, 13 Drawing Sheets

(58) Field of Classification Search
CPC . H04W 72/543; H04L 12/189; H04L 12/1877
USPC ..................................................... 455/414.1
See application file for complete search history.

(56) References Cited

U.S. PATENT DOCUMENTS

| | | | |
|---|---|---|---|
| 2009/0207773 | A1 | 8/2009 | Feng et al. |
| 2012/0182921 | A1 | 7/2012 | Tsuboi et al. |
| 2015/0305025 | A1 | 10/2015 | Moraru et al. |
| 2019/0059073 | A1 | 2/2019 | Xu et al. |
| 2020/0077287 | A1 | 3/2020 | Prasad et al. |
| 2021/0127448 | A1* | 4/2021 | Kadiri .................. H04W 76/27 |

FOREIGN PATENT DOCUMENTS

| | | |
|---|---|---|
| CN | 109548093 A | 3/2019 |
| CN | 110366131 A | 10/2019 |
| EP | 2 434 800 A1 | 3/2012 |
| EP | 3337287 A1 | 6/2018 |
| JP | 2018-078491 A | 5/2018 |
| WO | WO 2010/091605 A1 | 8/2010 |
| WO | WO 2019/037779 A1 | 2/2019 |

OTHER PUBLICATIONS

Supplemental European Search Report for Application No. EP 20 89 6798 dated Jan. 2, 2024 (9 pages).
Office Action dated Jan. 26, 2024 issued in corresponding Japanese Patent Application No. 2022-564257 w/translation (8 pages).
Samsung; "Solution for unicast-multicast delivery mode switch," 3GPP TSG SA WG2#136AH S2-2000891, 3GPP, Jan. 7, 2020 (8 pages).
Nokia; "Nokia Shanghai Bell, KT, Corrections on UE Context Setup procedure," 3GPP TSG RAN WG3 adhoc_R3-AH-1801 R3-180525, 3GPP, Jan. 30, 2018 (18 pages).
International Search Report and Written Opinion for International Patent Application No. PCT/CN2020/086630 dated Jan. 26, 2021, 8 pages.
3rd Generation Partnership Project; Technical Specification Group Radio Access Network; NG-RAN; FI application protocol (F1AP), 3GPP TS 38.473 V16,1,0, Mar. 31, 2020 (Mar. 31, 2020), relevant section: 8.3.1-8.3.4, 240 pages.
3rd Generation Partnership Project; Technical Specification Group Services and System Aspects; Mission critical services support in the isolated operation for public safety (IOPS) mode of operation; Functional architecture and information flows; 3GPP TS 23.180 V0.3.0, Jan. 31, 2020 (Jan. 31, 2020), 44 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, 3GPP TS 36.300 V16.1.0, Mar. 31, 2020 (Mar. 31, 2020), 386 pages.
Huawei. "New Work Item on NR support of Multicast and Broadcast Services", 3GPP TSG RAN Meeting #86 RP-193248, Dec. 12, 2019 (Dec. 12, 2019), 5 pages.
Office Action dated Jan. 29, 2024 issued in corresponding Japanese Patent Application No. 2022-564259 (6 pages).
Qualcomm Incorporated, Solution: Integrated MBS and Unicast Transport with Full Separation of MBS Service, 3GPP TSG SA WG2#136 S2-1911371, 3GPP, Nov. 8, 2019 (8 pages).
Extended European Search Report for Application No. EP 20 89 6024 dated Sep. 14, 2023 (10 pages).
International Search Report and Written Opinion for International Patent Application No. PCT/CN2020/086736 dated Jan. 28, 2021, 7 pages.
Nokia et al., "S2-1911366, PDU session enhanced for multicast to provide the basic multicast connectivity service", *SA WG2 Meeting #S2-136*, Nov. 22, 2019 (Nov. 22, 2019), 6 pages.
3rd Generation Partnership Project, "Technical Specification Group Services and System Aspects; Study on architectural enhancements for 5G multicast-broadcast services (Release 17)" *3GPP TR 23.757 V0.3.0*, Jan. 31, 2020 (Jan. 31, 2020), 37 pages.
Huawei, "RP-191859, Summary of moderated email discussion on Rel-17 NR Multicast Broadcast", *3GPP TSG-RAN #85*, Sep. 20, 2019 (Sep. 20, 2019), 31 pages.
Huawei et al., "S2-2000488, MBS architecture reference model", *SA WG2 Meeting #136AH1* , Jan. 17, 2020 (Jan. 17, 2020), 3 pages.
Huawei et al., "S2-2000489, MBS Session Management", *SA WG2 Meeting #136AH*, Jan. 17, 2020 (Jan. 17, 2020), 4 pages.

* cited by examiner

ACCESS NETWORK SIGNALING AND RESOURCE ALLOCATION FOR MULTICAST/BROADCAST SESSIONS

CROSS-REFERENCE TO RELATED APPLICATION

This application is a continuation application of PCT International Patent Application No. PCT/CN2020/086630, filed with the China National Intellectual Property Administration, PRC on Apr. 24, 2020, which is incorporated herein by reference in its entirety.

TECHNICAL FIELD

This disclosure is generally directed to Multicast/Broadcast Service (MBS) session context management and resource allocation in a wireless communication network and is particularly directed to access network level signaling and resource allocation for Point to Point (PTP) and Point to Multipoint (PTM) transmission of MBS session data or packet data unit (PDU) to user equipments.

BACKGROUND

There has always been a demand for Multicast Broadcast Services (MBS) in wireless communication networks. Such services have gradually expanded from the initial TV-like terrestrial broadcast video broadcasting services to public safety, Vehicle-to-everything (V2X), Internet of Things (IoT) and other application areas. Flexible and dynamic resource allocations and signaling mechanisms are desirable for achieving reliable and efficient delivery of the MBS session data to a plurality of User Equipments (UEs) having different reception conditions and requirements.

SUMMARY

This disclosure relates to methods, systems, and devices for MBS session resource allocation and specifically the context management and delivery mode switching. In particular, this disclosure describes an architecture for supporting MBS sessions in a wireless access network. Each of such MBS sessions is flexibly and dynamically delivered by the access network into one or more Point-To-Point (PTP, or unicast) and Point-To-Multipoint (PTM, or multicast) delivery instances. As such, a subset of the UEs participating in the MB S may be configured to receive the MBS session in a PTP-like manner and quality. The architecture further allows for access network level switching of one or more of the UEs participating in the MBS session between the PTP mode and PTM mode. Such switching are effectuated dynamically without involvement of application layer. The resource allocations and configuration for the PTP and PTM delivery instances may be performed in the access network collaboratively between a central unit (CU) and one or more distributed units (DUs). Such collaborative resource allocation and configuration may be effectuated using a novel architecture for the signaling messages between the CU and the DUs.

In some exemplary implementations, a method for wireless resource allocation, performed by a first access network node (ANN) in communication with a second ANN in an access network of a wireless communication network is disclosed. The method may include receiving a context information of a multicast/broadcast service (MBS) session from a core network; performing a first resource allocation for the MBS session; identifying a set of user equipments (UEs) targeted by the MBS session and served by the second ANN; dividing the set of UEs into a first subset and second subset of UEs for receiving the MBS session data from the second ANN over an air interface in a point-to-point (PTP) mode and a point-to-multipoint (PTM) mode, respectively, or receiving the division from the second ANN; transmitting, to the second ANN, according to a predetermined signaling message format, one or more signaling messages each comprising an identifier for the MBS session to cause the second ANN to perform an establishment, a modification, or a release of a second resource allocation and configuration for the MBS session; and receiving one or more response messages based on the predetermined signaling message format from the second ANN.

In some other implementations, a method for wireless resource allocation, performed by a first access network node (ANN) and a second ANN in an access network of a wireless communication network is disclosed. The method may include receiving, by the first ANN, a context information of a multicast/broadcast service (MBS) session from a core network; allocating, by the first ANN, at least one radio bearers (RBs) for the MBS session; identifying, by the first ANN, a set of user equipments (UEs) targeted by the MBS session and served by the second ANN; dividing, by the first ANN or the second ANN, the set of UEs into a first subset and second subset of UEs for receiving the MBS session from the second ANN over an air interface in a point-to-point (PTP) mode and a point-to-multipoint (PTM) mode, respectively; and exchanging, between the first ANN to the second ANN, one or more signaling messages each comprising an identifier for the MBS session to allocate, modify, or release of resource allocations for one or more PTP or PTM delivery instances in the first ANN and the second ANN for the MBS session.

DETAILED DESCRIPTION

Figure 1:
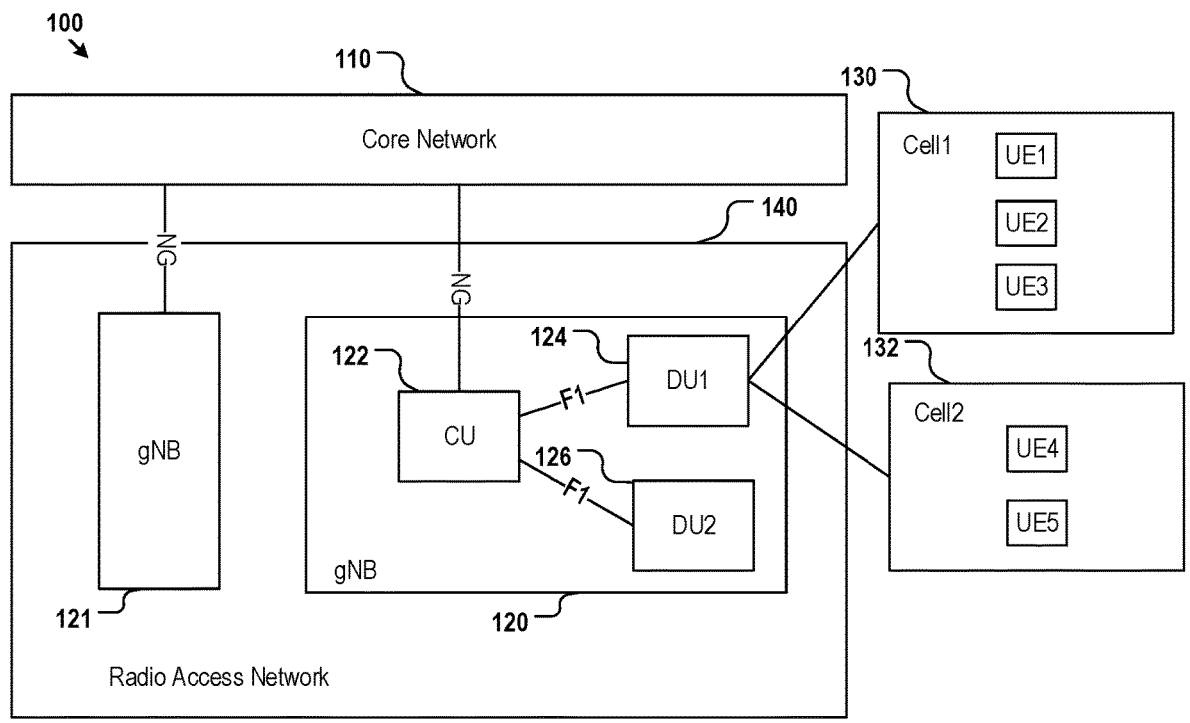
FIG. 1 shows an exemplary wireless communication network architecture.

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

INTRODUCTION

Multicast Broadcast Services (MB S) has been provided in wireless systems to some extent. One of such examples includes the Evolved Multimedia Broadcast Multicast Services (eMBMS) technology architecture in 4G wireless communication systems. However, various limitations of the eMBMS technology have restricted the expansion of cellular broadcasting services from the traditional TV-like terrestrial video broadcasting application to application scenarios including but not limited to public safety, Vehicle-to-everything (V2X), Internet of Things (IoT) and the like. In particular, the traditional eMBMS broadcast network architecture was essentially designed for semi-static video service distribution. For example, the delivery of an LTE eMBMS over an air interface relies on no or very limited feedback from UEs. As such, the network can only understand users' receiving interest and receiving quality of the MBS to a very limited extent. As a result, such a network architecture is not capable of providing flexible and dynamic resource allocation and scheduling of the MBS, thereby leading to an inefficient use of air interface resources.

The Single Cell Point to Multipoint (SC-PTM) technology was further introduced to improve to a certain extent the flexibility of air interface scheduling. However, SC-PTM technology essentially relies on the same fundamentals of the previous network architecture of the SC-PTM technology and merely adds an air interface data bearing mechanism based on independent scheduling in a single cell. For example, instead of using Physical Multicast Channels in traditional eMBMS, the SC-PTM technology instead uses PDSCHs (Physical Downlink Shared Channels) that are more consistent with unicast data. Despite of such improvement, the SC-PTM technology nevertheless fails to solve, at the architectural level, the problems related to, for example, the semi-static characteristics of the broadcast area configuration. Furthermore, SC-PTM as a network-side technology, is not adequately coordinated with the flexible and powerful air interface in the existing 3GPP framework. It may thus be difficult to achieve efficient utilization of communication resources and ensure service reliability and continuity.

In particular, there may be a need for a UE receiving the MBS session data to switch from a point to multipoint delivery mode to a point to point delivery mode, and vice versa, when its reception quality has been downgraded or improved. Based on the current LTE multicast broadcast technology, such as the eMBMS described above, it is only possible for such a UE to switch between unicast and broadcast through application layers. As a result, a long switching delay and potential service interruption may be incurred. Such delays and interruptions may be intolerable in time-sensitive multicast broadcast services, such as MCPTT (mission critical push to talk) for public safety applications.

The various implementations below describes an architecture for supporting MBS sessions in a wireless access network. Each of such MBS sessions is flexibly and dynamically delivered by the access network with one or more Point-To-Point (PTP, or unicast) and Point-To-Multipoint (PTM, or multicast) delivery instances. As such, a subset of the UEs participating in the MBS may be configured to receive the MBS session data in a PTP manner. The architecture further allows for access network level switching of one or more of the UEs participating in the MBS session between the PTP mode and PTM mode. Such switching are effectuated dynamically without involvement of application layers. The resource allocations and configurations for the PTP and PTM delivery instances may be performed in the access network collaboratively between a central unit (CU) and one or more distributed units (DUs). Such collaborative resource allocation and configuration may be effectuated using a novel architecture for the signaling messages between the CU and the DUs.

Wireless Communication Network Architecture

FIG. 1 illustrates an exemplary wireless communication network 100 which includes user equipment (UEs) and a carrier network. The carrier network, for example, may further include radio access network 140 and a core network 110. The radio access network may include one or more various types of wireless base station or wireless access network nodes (ANNs) 120 and 121 which may include but are not limited to gNB, eNodeB, NodeB, or other type of base stations. The access network 140 is backhauled to the core network 110. The wireless ANN 120, for example, may further include multiple separate ANNs in the form of a Central Unit (CU) 122 and at least one Distributed Unit (DU) 124 and 126. The CU 122 is connected with DU1 124 and DU2 126 via various F1 interface. An F1 interface, for example, may further include an F1-C interface and an F1-U interface, which are used to carry control plane data and user plane data, respectively. The UEs may be connected to the carrier network via the ANN 120 over an air interface. The UEs may be served by at least one cell. In the example of FIG. 1, UE1, UE2, and UE3 are served by cell 1 130 of the DU1, whereas UE4 and UE5 are served by cell 2 132 of the DU1. The UEs may include both mobile and fixed network devices. For example, the UEs may include but are not limited to mobile phones, laptop computers, tablets, personal digital assistants, wearable devices, distributed remote sensor devices, a vehicle on-board communication equipment, a roadside communication equipment, and desktop computers. While FIG. 1 and the various implementations described below are provided in the context of a 5G cellular wireless network, the underlying principles described herein are applicable to other types of radio access networks including but not limited to Wi-Fi, Bluetooth, ZigBee, and WiMax networks.

Figure 2:
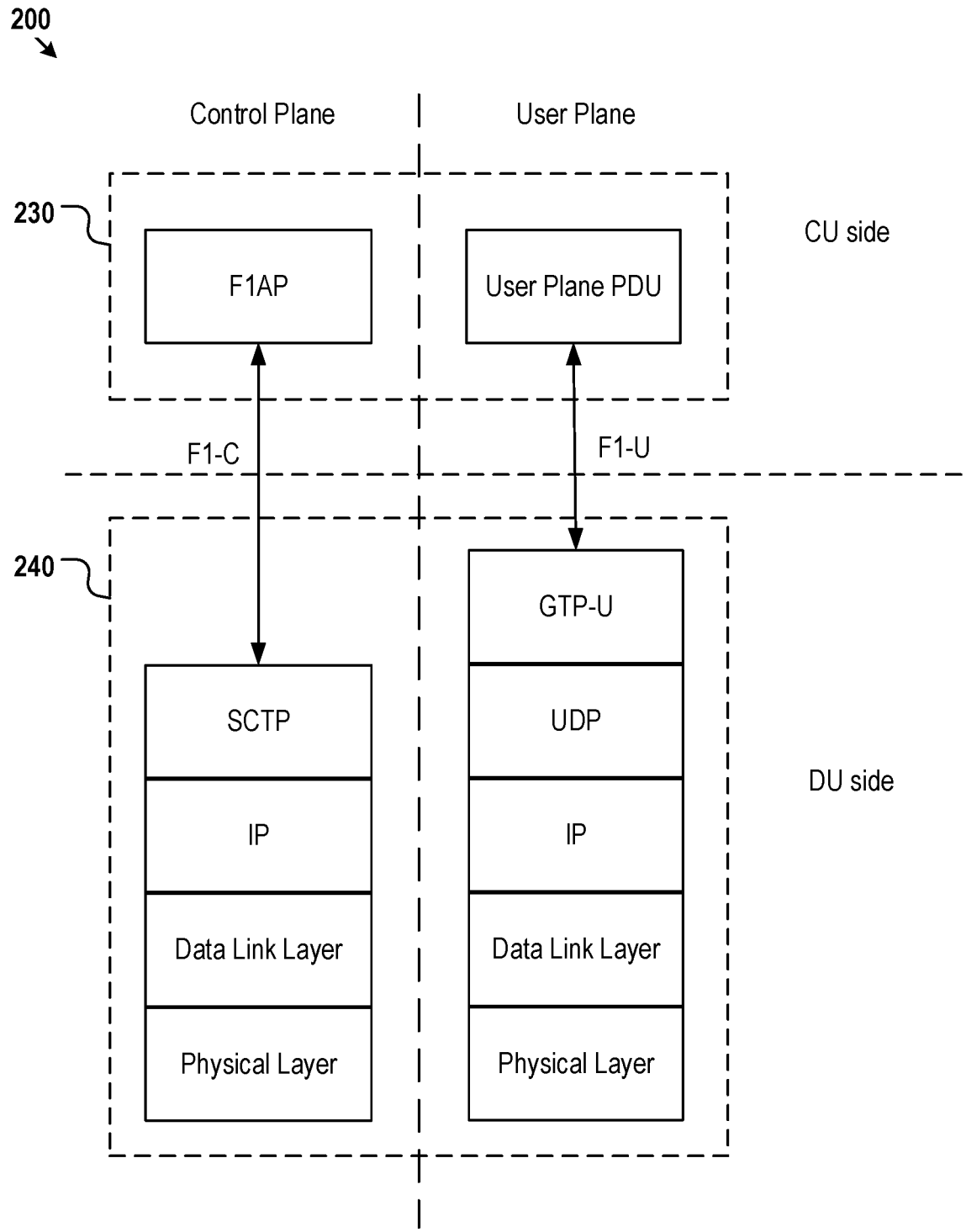
FIG. 2 shows exemplary protocol stacks of a control plane and a user plane in a central radio access network node (ANN) and a distributed radio access network node.

FIG. 2 illustrates an exemplary protocol stack implementation 200 of the F1 interface between the CU 122 and the DU 124. The control plane of CU and DU are connected by a F1-C interface. The user plane of CU and DU are connected by a F1-U interface. The F1-U interface is based on the GTP-U protocol which further relies on the UDP/IP for IP level data transmission.

In particular, the functions of a radio access network node may be split between the CU and the DU. The CU hosts RRC (Radio Resource Control), SDAP (Service Data Adaptation Protocol) and PDCP (Packet Data Convergence Protocol) protocols. The DU hosts RLC (Radio Link Control), MAC (Medium Access Control) and PHY (Physical) layers. The DU with the lower layer of the network may be responsible for allocating resources autonomously or under a control by the CU. In some embodiments, a CU may be associated with and controls multiple DUs.

In some embodiments, the CU is gNB Central Unit (gNB-CU), and the DU is gNB Distributed Unit (gNB-DU).

The signaling protocol between the CU and the DU is referred to as F1 Application Protocol (FLAP). The corresponding signaling may be divided into two categories: non-UE-associated and UE-associated. Such signaling may be implemented as various procedures which are used to support CU and DU interactions. For example, a Context Setup procedure may represent an UE-associated procedure used to establish the UE context including DRB configuration for a UE. For another example, a gNB-CU Configuration Update procedure, and a gNB-DU Configuration Update procedure are non UE-associated procedure which are used to update application level configuration data needed for the CU and the DU to interoperate appropriately over the F1 interface. In particular, these F1AP procedures may be invoked in a flexible manner, either independently or in a combination. Each of these procedures may be associated with at least one signaling message, which may or may not trigger a response message.

In the user plane, the F1-U link may be implemented based on, for example, the GPRS Tunneling Protocol (GTP-U) over UDP and may be used to carry user data in units of PDCP Protocol Data Units (PDUs), as shown in FIG. 2. Data may be transmitted from CU to DU (downlink) or from DU to CU (uplink). When the CU is connected to and controls multiple DUs, downlink data communication from the CU to the multiple DUs may be based on, e.g., the GTP-U protocol, and may be carried in IP multicast or IP point-to-point tunnels. For a DU participating in an IP multicast from the CU, information for identifying an IP multicast tunnel including, for example an IP multicast address and a tunnel identifier (e.g., a Tunnel Endpoint Identifier (TEID)) may be provided to the DU from the CU via the F1-C interface. For an IP point-to-point communication from CU to DU, a destination IP address and tunnel identifier may be provided by the DU to the CU, again, via the F1-C link, for the CU to transmit data to the DU. A data tunnel between the CU and DU may be bi-directional. In other words, a single tunnel may support both downlink and uplink data transmission.

Access Network Level Implementation of MBS in PTP and PTM Modes

The wireless communication network may be configured to provide Multicast/Broadcast Service (MBS) to at least one UE. To establish an MBS session, the core network sends the session management related contents to the access network, wherein the session management related contents includes the context for the MBS, such as:

The Quality of Service (QoS) information corresponding to QoS flows of the MBS session. For example, each of the QoS flows of the MBS session may be associated with different QoS parameters. Each data flow with a corresponding QoS parameters may be referred to as a QoS flow.

If the MBS session is a Multicast session, a UE list of the UEs associated with the Multicast session (or targeted by the Multicast session). For example, the UE list may include identifier of a set of UEs associated with the access network that have applied for and are allowed to receive the multicast service. Optionally, a multicast area list may be included if needed. The multicast area list may be provided in a form of a list of multicast area indexes or in a form of a list of cells. Each multicast area index may be further mapped to a cell list.

If the MBS session is a Broadcast session, a broadcast area list. For example, the broadcast area list may be provided in a form of a list of broadcast area indexes or in a form of a list of cells. Each broadcast area index may be further mapped to a cell list. The mapping relationship may be implemented by the interaction between the core network and the radio access network, or it may be determined by the radio access network autonomously.

After receiving the MBS session context information from the core network, the access network further allocates various communication resources to implement a transmission or delivery of the MBS session data from the access network to the UEs and to receive various status reports from the UEs if needed. Such a transmission of the MBS session data may be performed in the QoS granularity of radio bearer. Correspondingly, the various communication resources may be allocated for each radio bearer. In this disclosure, the term Multicast/Broadcast Radio Bearer (MRB) is used to represent a radio bearer serving the MBS session. An MRB may be alternatively referred to as a radio bearer (RB). Each MRB is associated with its own QoS parameters.

Based on the MBS context information, the access network maps each of the QoS flows of the MBS with certain set of QoS flow parameters to a corresponding MRB having QoS parameters meeting the QoS requirements of the QoS flow according to predefined or dynamically configurable criteria. In some implementations, multiple QoS may be mapped to one MRB. The access network may further decide a UE-specific delivery mode of the various MRBs to each of the UEs participating in the multicast/broadcast service session via the air interface. Such a delivery mode, for example, may include a PTP delivery mode or a PTM delivery mode.

In a PTP delivery mode, QoS flow(s) of the MBS session that are mapped to an MRB are transmitted from access network to a particular UE using communication resources allocated for the particular UE. A UE in a PTP delivery mode, thus use independent resource allocation for receiving the MBS in a unicast fashion. In a PTM delivery mode, data flow(s) of the MBS session that are mapped to an MRB are transmitted from access network to a group of UEs (referred to as a PTM UE group) using communication resources allocated to and shared by the PTM UE group. In some implementations, the set of UEs receiving the MBS session data are divided into a subset of UEs each receiving the MBS session in the PTP mode and a subset of UEs that receive the MBS session in the PTM mode. The subset of UEs receiving the MBS session in the PTM mode may be further divided into multiple PTM UE groups. Each of the PTM UE group may be allocated with communication resources that are separate from other PTM groups.

In some implementations, one specific UE may be receiving the MBS session data in PTP mode, and switched to PTM mode, or vice versa, dynamically. In some implementations, one specific UE may be receiving the MBS session data in both of the PTP mode and PTM mode.

The service data of the MBS session is referred to as MBS Session data in some implementation and as MBS Session packet data unit (PDU) alternatively in other implementations.

PTP and PTM Delivery Instances

Figure 3:
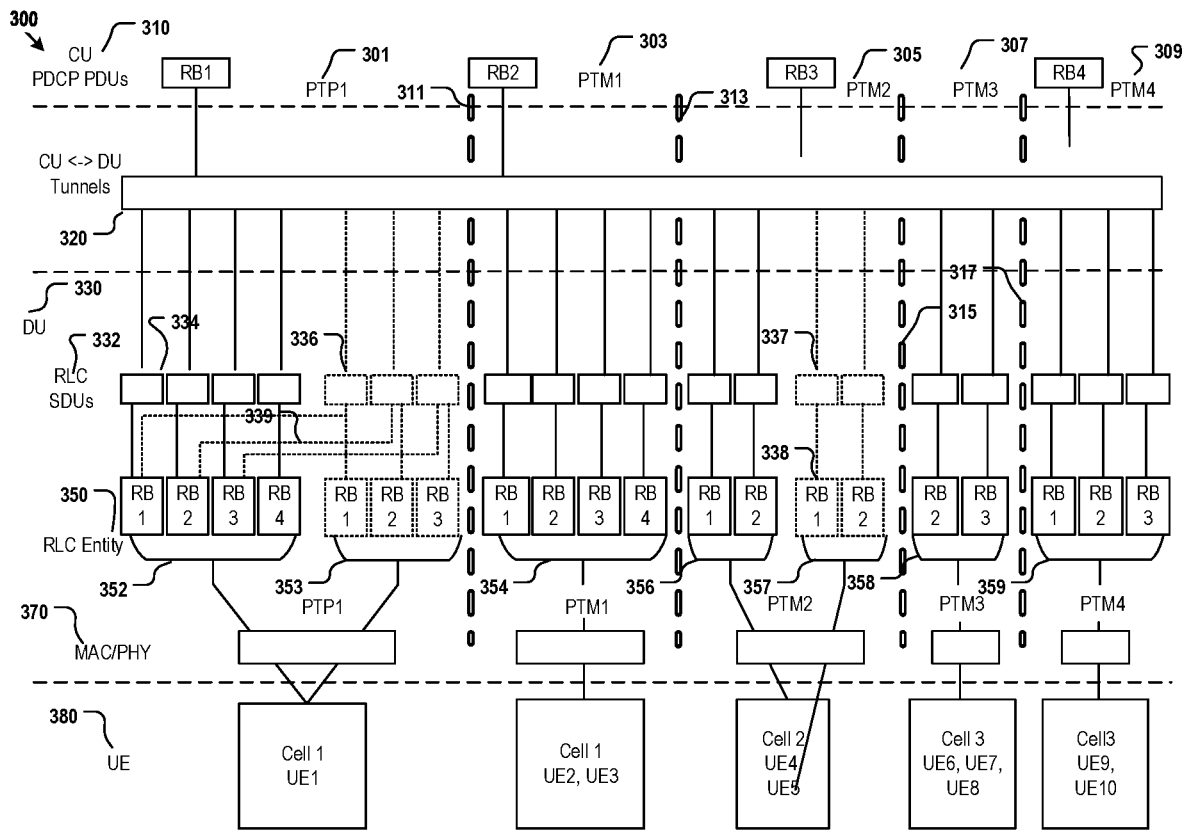
FIG. 3 shows exemplary resource allocations and data paths through different layers and network entities for deliver a MBS in a point-to-point (PTP) and point-to-multipoint (PTM) delivery modes to a group of UEs served by different cells.

In the context of the description above, the communication resource allocation in the access network for the MBS session may be collectively viewed as various allocation instances, referred to as delivery instances. Each of the delivery instances corresponds to a set of communication resources for either a PTP transmission to a particular UE (referred to as a PTP delivery instance) or a PTM transmission to a PTM group of UEs (referred to as a PTM delivery instance). Example PTP or PTM delivery instances in the access network of FIG. 1 are illustrated in FIG. 3. In particular, five (5) different delivery instances are shown as 301, 303, 305, 307, and 309, delineated by double dashed lines 311, 313, 315, and 317, with further details given below.

Such implementations branch the MBS session into parallel delivery instances with corresponding communication resources that are allocated to support UEs with varying reception quality requirements and reception channel conditions. The MBS session data may be provided to some of the UEs with point-to-point or unicast like quality characteristics.

The decision of a delivery mode for each of the UEs may be made by the access network based on the UE information that can be obtained from the wireless communication network. As will be described in further detail below, such decision may be made by either the CU or the DU of the access network. The corresponding resource allocations for various PTP or PTM delivery instances may be performed by the DU and/or CU. Some of the resources, particularly the user plane downlink data tunnels for transmitting or re-transmitting MBS data flows from the CU to the DU or uplink data tunnels for transmitting UE reports from the DU to the CU may be shared among different delivery instances in some situations and in various manners, as will be described in further detail below.

In the context of the functional split between CU and DU as shown in the example access network in FIGS. 1 and 2, the communication resource allocations to support various PTP and PTM delivery instances may include resources allocated in various air interface protocol stacks of the CU and DU, as well as F1-U resources between the CU and DU.

In summary, a delivery instance for the MBS session in the radio access network corresponds to a resource set and the associated configuration to deliver the MBS session data. Such resources, for example, may include SDAP (Service Data Adaptation Protocol) entity, PDCP (Packet Data Convergence Protocol) entity, F1-U instances, Radio Link Control (RLC) entity, and MAC/PHY resources.

In some exemplary implementations, a PTP or PTM delivery instance described above may be associated with one or more of the following characteristics:

An identity (ID) for the delivery instance. For a certain MBS session, the delivery instance ID may be unique within the PLMN (Public Land Mobile Network), or within the CU, or within the DU, or within a cell. A delivery instance ID may uniquely identify a delivery instance and its associated characteristics.

A delivery mode, including either a PTP delivery mode or PTM delivery mode. Again, a delivery instance using the PTP delivery mode may be referred to as a PTP delivery instance whereas a delivery instance using the PTM delivery mode may be referred to as a PTM delivery instance. An identifier of the particular UE might be used to identify a PTP delivery instance. Instance identifier for PTM delivery instance might be:

- a cell identifier of a cell when the PTM delivery instance is the only PTM delivery instance in the cell for the MBS session;
- a cell identifier of a cell together with a PTM delivery instance index of the PTM delivery instance in the cell when the cell is associated with multiple PTM delivery instances for the MBS session; or
- an PTM delivery instance ID that uniquely identifies the PTM delivery instance within the DU or within the F1 interface for the MBS session. In some embodiments, and conversely, given an instance ID of a PTM delivery instance that is unique in a cell, the identity of the cell can be derived.

Each delivery instance may be associated with one or more MRBs of the MBS session. For example, a delivery instance may be associated with all of the MRBs of the MBS session. For another example, a delivery instance may be associated with a subset of the MRBs of the MBS session.

For each MRB associated with a delivery instance, there is at least one first F1-U data tunnel used to transmit the MRB data (e.g., a PDCP PDU, or PDCP protocol data unit) between the CU and DU. Such a first F1-U data tunnel may be shared by multiple delivery instances for the same MRB. In some implementations, all delivery instances associated with the same DU may share the same first F1-U data tunnel for a particular MRB. In some other implementations, each delivery instance may be allocated with an independent first F1-U data tunnel for a particular MRB. In yet some other implementations, some delivery instances may use independent first F1-U data tunnels and other delivery instances may share first F1-U data tunnels in one or more groups of delivery instances for a particular MRB. For example, for a particular MRB, each PTP delivery instances may use independent first F1-U data tunnels, whereas other PTM delivery instances may share first F1-U data tunnels. In some implementations, a higher priority may be given in the resource allocation to the PTP delivery instances to be provided with independent first F1-U data tunnels than PTM delivery instances.

An MRB in either a PTP or PTM delivery instance may be associated with a second F1-U data tunnel for transmitting the PDCP PDU of the MRB from the CU to the DU for UE-specific retransmission of the MRB data to the a particular UE (either the target UE for a PTP delivery instance, or a particular UE of the PTM UE group of a PTM delivery instance). Likewise, a particular MRB may be associated with multiple second F1-U tunnels each for one of the UEs in the PTM UE group for UE-specific PDCP PDU retransmission of the particular MRB.

The first F1-U data tunnel above for data transmission and the second F1-U data tunnel above for retransmission for a particular MRB in a particular PTP delivery instance may be shared when such a shared data tunnel is exclusively used for the particular PTP delivery instance and is not further shared with other delivery instances.

The second F1-U data tunnel above for retransmission of a particular MRB in either a PTP delivery instance or a PTM delivery instance may be further used as either a bi-directional data tunnel (for both downlink and uplink data transmission between the CU and the DU) or unidirectional data tunnel (only from CU to DU). Such a bi-directional data tunnel may be further used to transmit UE report from the DU to the CU for the particular UE-associated with such a data tunnel and for the particular MRB. Such UE report may be a PDCP status report for the particular MRB.

For each MRB associated with a delivery instance, there is at least one RLC entity allocated for transmitting the MRB data to the UE via the MAC/PHY resources associated with the RLC entity. For a PTP delivery instance, such an RLC corresponds to transmission of the MRB data to a particular UE. For a PTM delivery instance, such a RLC entity is common to all UEs in the PTM UE group. For a PTM delivery instance, the corresponding RLC PDU serves all UEs in the PTM UE group.

The RLC entity associated with a particular MRB in a PTP delivery instance, may be further responsible for retransmission of the MRB data to the particular UE with the PTP delivery instance when retransmission is needed. In other words, no duplicated RLC entity may be needed for the retransmission of a MRB in a PTP delivery instance. Alternatively, a separate RLC entity may nevertheless be allocated for the MRB in the PTP delivery instance for retransmission of the MRB to the particular UE.

For a particular MRB in a PTM delivery instance, a separate UE-specific RLC entity for a particular UE of the PTM UE group may be allocated for UE-specific retransmission of the MRB data to the particular UE, and uplink of the UE-specific PDCP status report associated with the MRB.

Different delivery instances may share certain transmission resources and configurations. For example, as described above, for an MRB of an MBS session, F1-U resources for the MRB may be shared in the same CU/DU interface among different delivery instances.

Each PTP or PTM delivery instance corresponds to a MAC/PHY configuration set. According to the configuration set, the UE or UEs can complete the reception of the MBS delivery instance according to the time and frequency domain corresponding to the MAC/PHY configuration set.

The MAC/PHY configuration set may further include:
DRX information corresponding to this PTM delivery instance
The Radio Network Temporary Identifier (RNTI) of the PTM delivery instance
Time domain scheduling information corresponding to the PTM delivery instance to indicate the subframe or slot where the PTM transmission is scheduled
The frequency domain resource allocation information corresponding to the PTM delivery instance.
PDCCH (Physical Downlink Control Channel) configuration and the PDSCH (Physical Downlink Shared Channel) configuration corresponding to this PTM delivery instance.
The BWP (Bandwidth Part) information corresponding to the PTM delivery instance.

For a UE participating in receiving a MBS session, the UE receives the MBS session data using resource allocations of at least one delivery instance, either a PTP delivery instance or a PTM delivery instance. In some embodiments, a UE may be allowed to receive MRBs of a certain MBS session using both a PTP delivery instance and a PTM instance. In some exemplary implementations, the UE may receive all or parts of the MRBs data of the MBS session in a PTP delivery instance and also receive all MRBs data in a separate PTM delivery instance which also delivers the MRBs data to other UEs in a PTM manner. As such, the UE may receive at least one of the MRBs from both the PTP delivery instance and the PTM delivery instance using corresponding different sets of resources. Such a redundancy reduces package loss and failed delivery of MRBs to the UE in some situations.

User Plane Resource Architecture for Delivery Instances in a MBS Session

Figure 11:
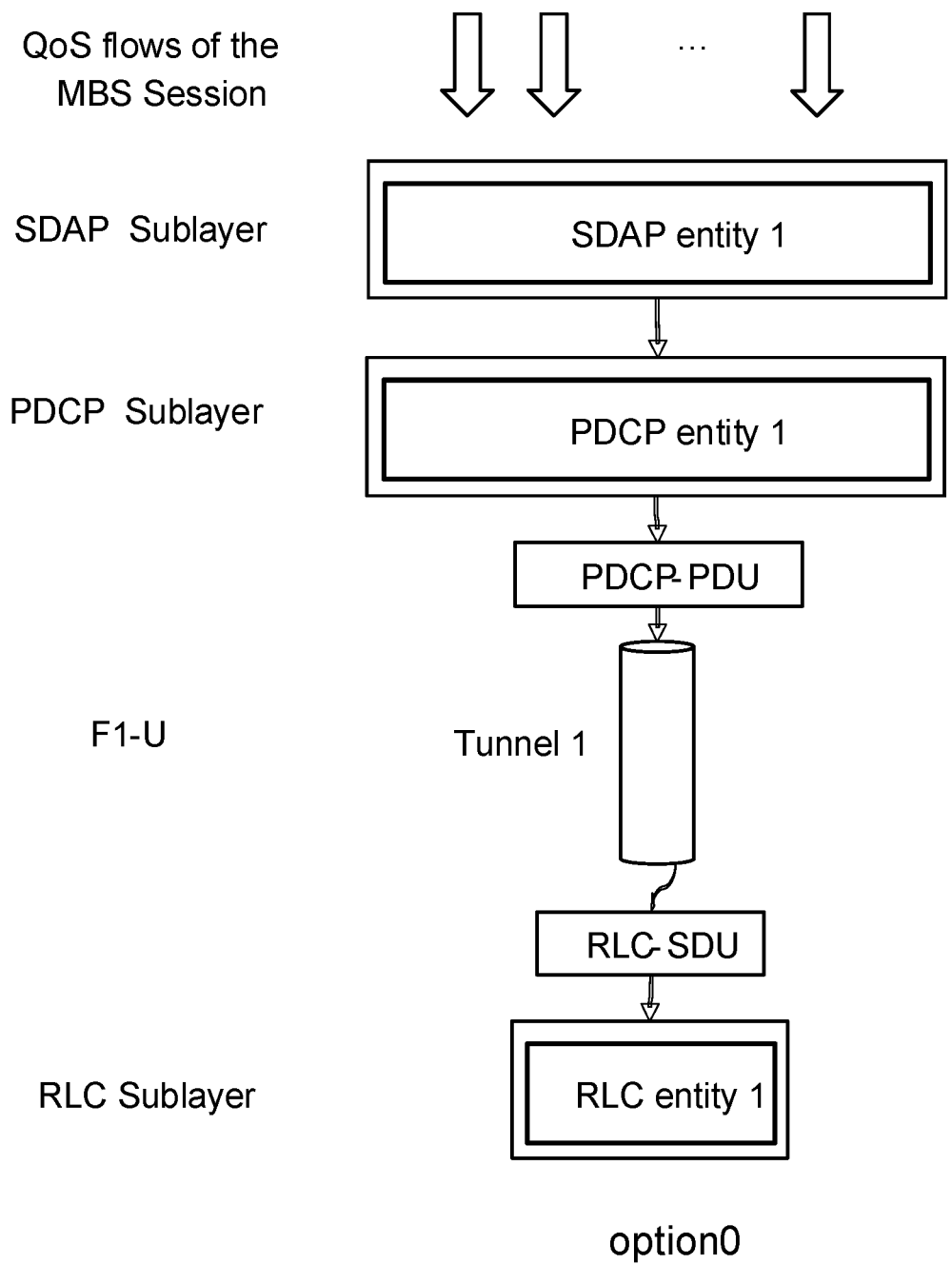
FIG. 11 shows an example option for user plane architecture for delivery instances.
Figure 12:
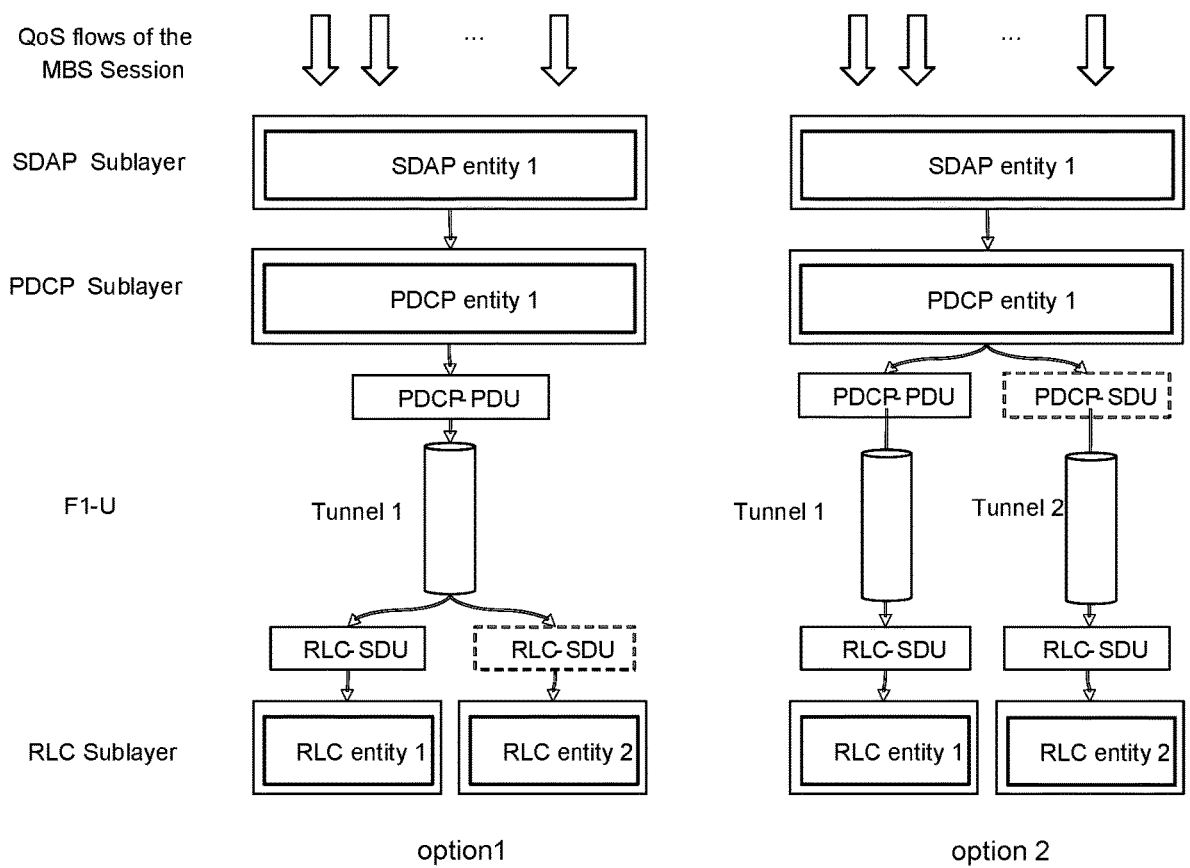
FIG. 12 shows other example options for user plane architecture for delivery instances.

To enable delivery mode switching from one mode to another for a UE and different delivery mode for the group of UE associated with the same MBS session, five (5) options of user plane architectures are given as shown in FIGS. 11-12. At least two scenarios for UEs mode switching are considered:

Delivery mode switching from one mode to another for one specific UE, for example, UE1 receiving the MBS session data in PTM mode may experience poor connection. As a result, the UE1 may then be re-configured to receive the MBS session data in PTP mode to improve the receiving quality. Or vice versa, the UE can also be re-configured to switch to PTM mode from PTP mode, e.g., to achieve better spectrum efficiency.

Different delivery modes may co-exist for different UEs. For example, a group of UE that are interested in the MBS session might be associated with the same CU or DU. The connection status might be different, or the UEs may belong to different DU or physical cells, therefore there can be more than one delivery instances for different UEs, e.g., PTP delivery for UE1 in one cell, and PTM delivery for UE2 and UE3 in another cell. Delivery instances for the same MBS session may co-exist in the same cell.

Figure 13:
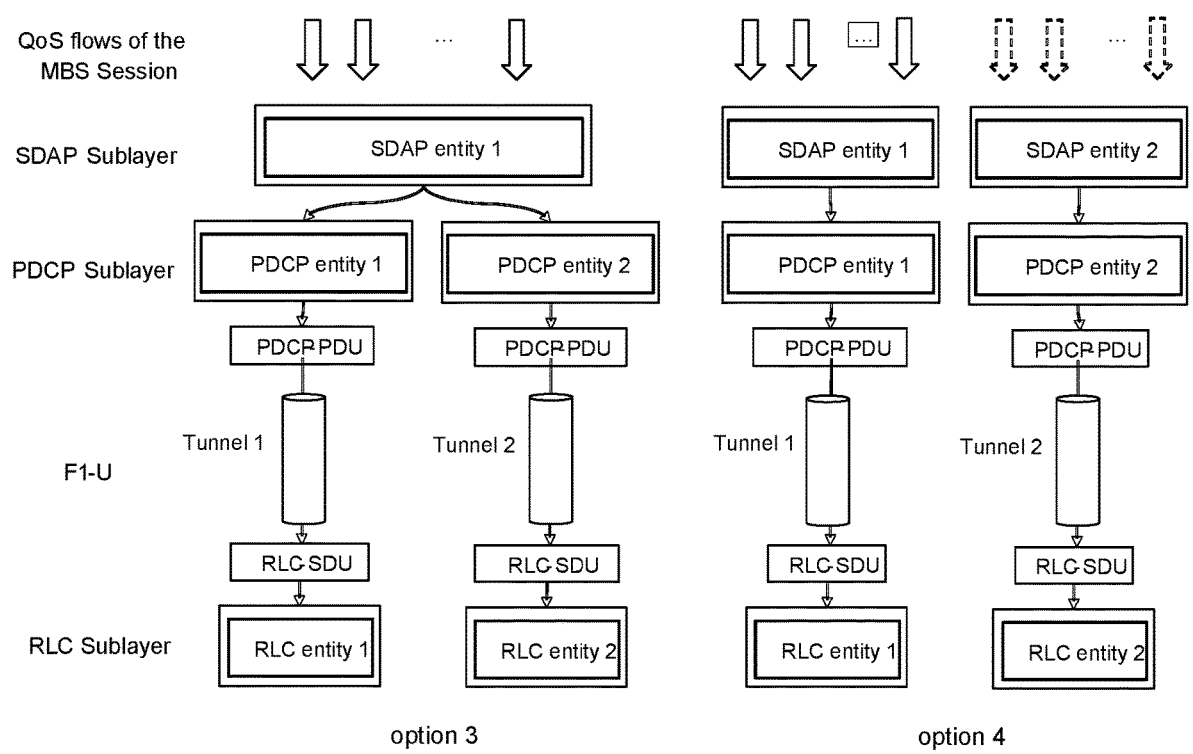
FIG. 13 shows yet some other example options for user plane architecture for delivery instances.

In other words, as shown in FIGS. 11-13, the RLC entities 1 and 2, as part of the corresponding delivery instances, may be associated with the same UE, or different UEs in different scenarios. In FIGS. 11-13, the RLC entities 1 and 2, including the corresponding delivery instances, may serve the same UE, or different UEs at different times. The architectural option of the delivery instances can be applied to both scenarios.

To enable the delivery of QoS flows associated with the MBS Session to the UEs in different delivery mode, i.e., PTP, PTM or both, for the same UE or different UEs, there are a few different options from the user plane (UP) architectural perspective as shown in FIGS. 11-12. The protocol stack for the delivery instances comprise the SDAP, PDCP, RLC, MAC and PHY protocols or layers. For the above scenarios, different user lane architecture options utilize a different protocol layer as an anchor layer for the mode switching or delivery mode co-existing, and in all the options different RLC entities are used for different delivery mode, either for the same UE or different UEs simultaneously. Protocol layers above at and above the anchor layer are shared by the delivery instances. The description below focuses on mode switching for one specific UE from one delivery mode to another. The underlying principle is also applicable to cases with different UEs in different receiving modes, or UEs in different sub-groups with PTM modes. UEs in different sub-groups either receive the MBS session data in different cells, or in the same cell but receiving the MBS session data in different delivery configuration, e.g., different physical layer configuration.

Option 0 (FIG. 11). For one specific MRB, two different delivery instances share the same SDAP, PDCP entity, the F1-U instance, and the RLC entities. The anchor layer is RLC. Protocol layers at RLC and above (all layers shown in FIG. 11, except the physical layer) are shared by the delivery instances. The QoS flows or data flows from the core network are submitted to the shared SDAP entity 1; part or all of the QoS flows are mapped to the MRB (possible other MRBs are not depicted); the corresponding PDCP PDUs are submitted to the F1-U tunnel 1 in case of CU/DU split scenarios; the PDCP PDUs are submitted to a shared RLC entity that serve different UEs. In some implementations, the two delivery instances further share the MAC entity, and the same MAC PDUs are scheduled separately in two different sets of physical resources.

Option 1 (FIG. 12). For one specific MRB, two different delivery instances share the same SDAP and PDCP entity, and also the same F1-tunnel instance, but different RLC entities. The anchor layer is F1-U at the DU side. Protocol stack layers at F-U and above are shared by the delivery instances. The QoS flows or data flows from the core network are submitted to the shared SDAP entity 1; part or all of the QoS flows are mapped to the MRB (possible other MRBs are not depicted); the corresponding PDCP PDUs are submitted to the F1-U tunnel 1 in case of CU/DU split scenarios; the PDCP PDUs are submitted to different RLC entities that serve different UEs, or are duplicated and submitted to more than one RLC entities in case the UEs receive the MBS session data in both modes.

Option 2 (FIG. 12). For one specific MRB, two different delivery instances share the same SDAP and PDCP entity, but different F1-tunnels i and RLC entities. The anchor layer thus is the PDCP layer. Protocol stack layers at the PDCP layer and above are shared by the delivery instances. The QoS flows or data flows from the core network are submitted to the shared SDAP entity1; part or all of the QoS flows are mapped to the MRB (possible other MRB is not depicted); the corresponding PDCP PDUs are submitted to different F1-U instances, e.g., tunnel 1 and tunnel 2, in case of CU/DU split scenarios; the PDCP PDUs are submitted to different RLC entities, respectively.

Option 3 (FIG. 13). Two different delivery instances share the same SDAP entity, but different PDCP entity, F1-tunnel instances and RLC entities. The anchor layer is SDAP layer. Protocol stack layers at the SDAP layer and above are shared by the delivery instances. The QoS flows or data flows from the core network are submitted to the shared SDAP entity1; the QoS flows are mapped to one set of MRBs, while the same QoS Flows are mapped to another set of MRBs with the same or different mapping rule. The MRBs data are then dealt with by different PDCP entities with separate sequencing operations. Consequently, the PDCP PDUs from the above different PDCP entities are sent to DU in different F1 tunnels and submitted to different RLC entities.

Option 4 (FIG. 13). Two different delivery instances share separate SDAP entities, PDCP entities, F1-tunnel instances and RLC entities. The anchor layer is N3-U (above SDAP). In such case, the delivery instances are independent from each other. The same set of QoS Flows of the MBS session are dealt with by two different sets of Uu protocol layers, including different SDAP entities, PDCP entities, F1-U tunnels, and RLC entities.

In the next section of this disclosure, more details for option1 and option2 is given.

User Plane Resource Configuration and MBS Data Flow in Delivery Instances in a MBS Session Part 2

Figure 4:
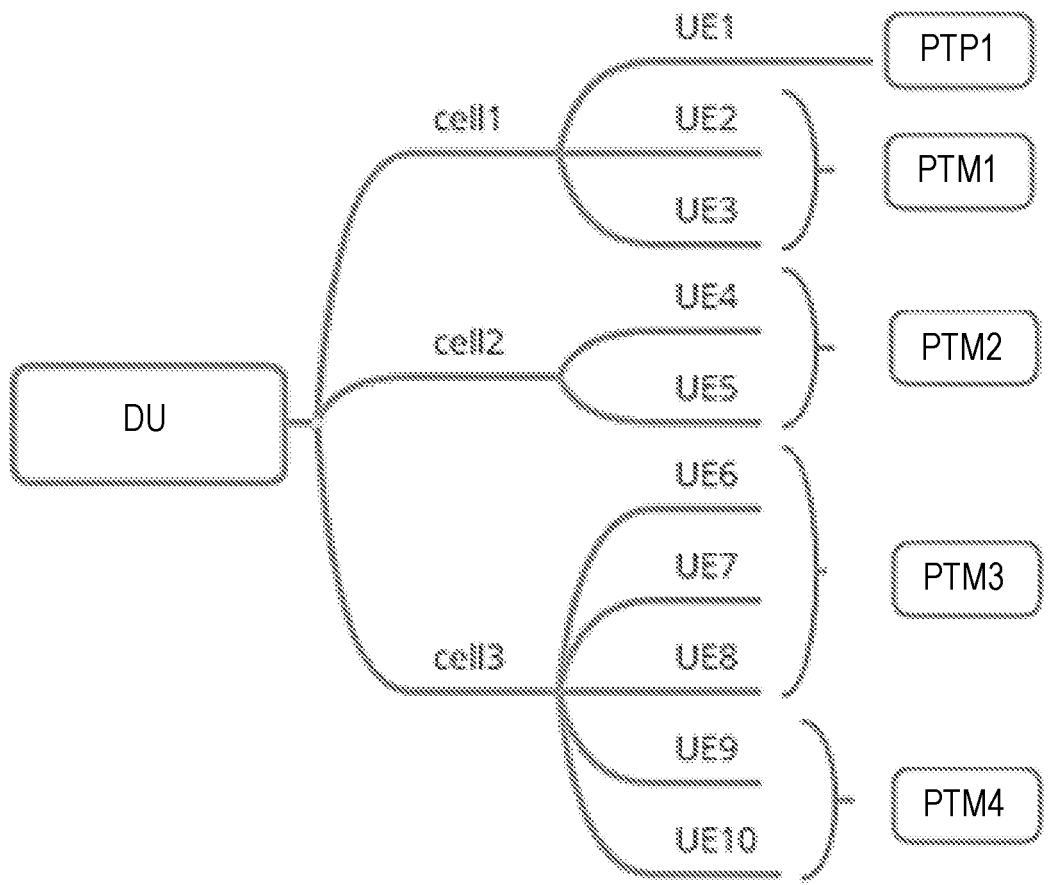
FIG. 4 shows an exemplary serving cell configuration and attribution of delivery mode and delivery instance among various UEs within the serving cells.

FIG. 3 illustrates an exemplary data resource configuration and data paths in an access network including a CU and a DU for transmitting a MBS session. While the MBS session may be delivered by multiple DUs under a control of the CU, the disclosure below only takes one DU into consideration. The underlying principles apply to other DUs. As an example, a particular DU-UE configuration is assumed, as illustrated in FIG. 4. In particular, the DU is associated with multiple cells including cell 1, cell 2, and cell 3 of FIG. 4. With regard to this DU, there are multiple UEs distributed in the serving cells of the DU that receive the MBS using either a PTP or PTM delivery mode associated with resource allocations for various PTP or PTM delivery instances, as listed below:

Cell 1—UE1, PTP delivery instance 1;
Cell 1—UE2 and UE3, PTM delivery instance 1;
Cell 2—UE4 and UE5, PTM delivery instance 2;
Cell 3—UE6, UE7, and UE8, PTM delivery instance 3;
Cell 3—UE9 and UE10, PTM delivery instance 4.

Such DU-UE configuration is further shown as 380 in FIG. 3. In FIG. 3, resource allocations in the CU-DU system for the five (5) delivery instances are delineated by the double dashed lines 311, 313, 315, and 317, with the corresponding delivery instances shown by 301 (PTP1), 303 (PTM1), 305 (PTM2), 307 (PTM3), and 309 (PTM4). The resource allocations and data paths of FIG. 3 are laid out from upper layer through lower layer of the network protocol stack in the CU-DU system to the UEs, which include: CU 310, the F1-U data tunnels 320 between CU and DU, DU 330, and UEs 380. Those of ordinary skill in the art understand that FIG. 3 merely includes some resource allocations and data paths relevant to the description of the various embodiments of this disclosure.

The CU 310 allocates MRBs for the various QoS flows of the MBS session. For this particular MBS session, as an example, it is assumed that the QoS flows of the MBS session are mapped to 4 MRBs, labeled as RB1, RB2, RB3, and RB4 in the PDCP layer of the CU 310, corresponding to four sets of PDCP PDUs.

These PDCP PDUs associated with RB1-RB4 are transmitted to the DU via the F1-U interface using data tunnels 320. Multiple shared or non-shared data tunnels may be included in the F1-U data tunnels 320, as described above. These data tunnels may be downlink, uplink, or bi-directional. Further details about F1-U data tunnel configuration and sharing are provided when specific implementations are described below.

The DU 330 receives data from the F1-U data tunnels, and the data is then submitted to the RLC entities (RLC SDUs 332). Each RLC SDU of 332 corresponds to an MRB and is associated with one of the PTP or PTM delivery instances 301, 303, 305, 307, and 309. The RLC SDUs are then submitted to the RLC entities 350. Each RLC entity corresponds to an MRB and is associated with one of the PTP or PTM delivery instances 301, 303, 305, 307, and 309.

Each of the delivery instances may be responsible for delivering one or more MRBs' data (all of the MRBs or a subset of the MRBs) to a UE (for a PTP delivery instance) or multiple UEs (for a PTM delivery instance). Each MRB being transmitted by a particular delivery instance is associated with an RLC entity. For example, as shown by 352 in FIG. 3, the PTP delivery instance 301 (PTP 1) is responsible for delivering all four MRBs to UE 1 in cell 1 and are then allocated with four RLC entities corresponding to the four MRBs. For another example, UE2 and UE3 served by at least cell 1 sharing the delivery instance of PTM 1 may also need to receive all of the four MRBs using four RLC entities allocated for the delivery instance of PTM 1, as shown by 354. UE4 and UE5 served by at least cell 2 sharing the delivery instance of PTM 2 may only be able to receive two RBs: RB 1 and RB 2. For example, the RB 3 and RB 4 fail to be setup for delivery instance of PTM 2. The delivery instance PTM2 is thus only allocated with two corresponding RLC entities, as shown by 356. Likewise, UE6, UE7, and UE8 served by cell 3 sharing the delivery instance of PTM3 may only need to receive data of 2 RBs: RB2 and RB3. The delivery instance of PTM 3 is thus allocated with two corresponding RLC entities, as shown in 358. Finally, UE9 and UE10 served by at least cell 3 sharing the delivery instance PTM4 may only need to receive data of three RBs: RB1, RB2, and RB3. The delivery instance of PTP4 thus may be allocated with three corresponding RLC entities, as shown by 359.

For retransmission of a particular MRB for a particular UE in a PTM instance when configured, an additional RLC entity may be allocated in the PTM instance for the particular UE and the particular MRB because the original RLC entity allocated for transmission of the particular MRB is shared with at least one other UEs in the PTM UE group. For example, as shown in FIG. 3, the PTM delivery instance PTM 2 may need resource allocations for retransmission for both RB1 and RB2 for UE5. As such, additional RLC entities 357 may need to be allocated for such UE-specific retransmission of RB1 and RB2 because the original RLC entities 356 are shared by other UEs.

For retransmission of a particular MRB for a UE in a PTP delivery instance, the original RLC entity may be used and no additional RLC entity may need to be allocated for such retransmission because the original RLC entity in such a PTP delivery instance is not shared with other UEs. However, in some alternatively implementations, an additional RLC entity may nevertheless be allocated for such a retransmission. For example, as shown in FIG. 3, the PTP delivery instance PTP 1 may need retransmission for RB1, RB2, and RB3 for UE1. Because the original RLC entities 352 are not shared with other UEs (i.e., RLC resources of a PTP instance is not shared with other instances), they may be used for the retransmission without allocating any additional RLC entities. Alternatively, additional RLC entities 353 may nevertheless be allocated for such PTP retransmission to UE 1.

For either a PTP or PTM delivery instance, RLC SDUs corresponding to the retransmission PDCP PDUs as shown by 336 for PTP 1 delivery instance and 337 for PTM 2 delivery instance in FIG. 3 are for retransmission. For the PTP1 delivery instance, in the case that no additional RLC entities (such as 353) are allocated, the additional retransmission RLC SDU 336 would be submitted to the original RLC entities, as shown by the dotted routing lines 339.

As further shown by 370 in FIG. 3, each delivery instances 301, 303, 305, 307, and 309 is also associated with corresponding set of MAC entities and physical layer functions for transmission of the MBS data via the air interface to the UEs.

The example resource configuration above may be allocated by the CU and DU as controlled by signaling information and the corresponding response communicated between the CU and the DU via the F1-C interface. FIG. 3 merely represents an exemplary snapshot of such resource allocations and configurations. Such resource allocations and configurations may be dynamically established, modified, and released at any time under the control of such signaling interactions. For example, a particular UE may be switched between the PTM and PTP delivery modes. The resource allocations and configurations may be modified dynamically to reflect such switching. Such switching and resource reallocation can be accomplished in the access network level without involvement from the application layer and can thus be effectuated with minimal delays and service interruptions.

Various exemplary implementations for the signaling procedure, the design of information content of such signaling and response, the messaging format, and distribution of the configuration tasks between the CU and the DU are further described in more detail below.

Figure 5:
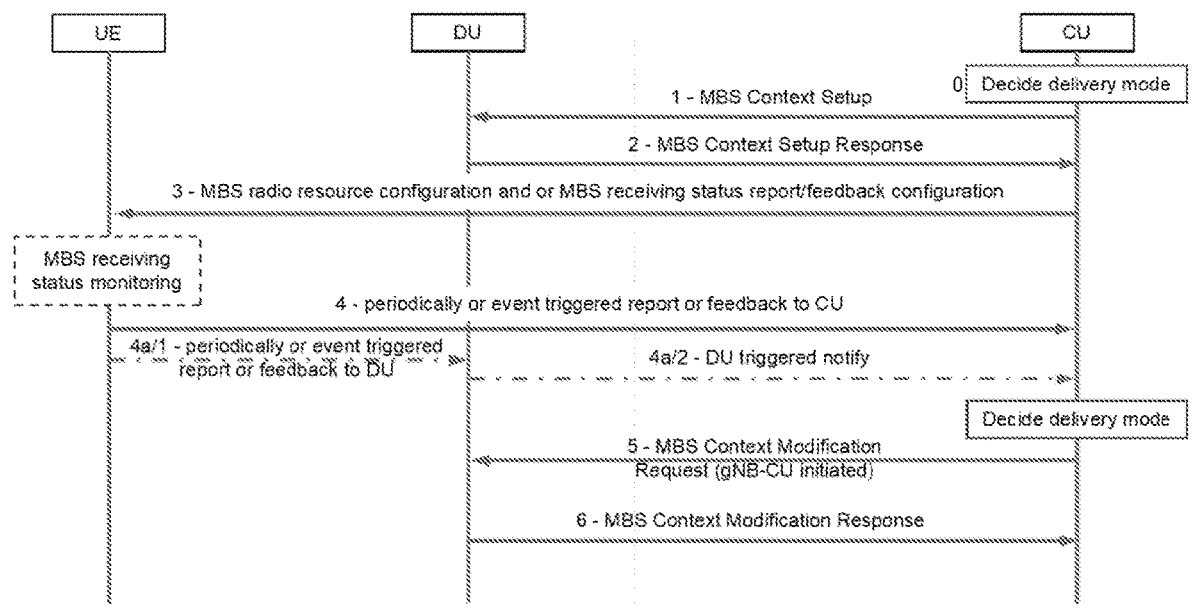
FIG. 5 shows an exemplary signaling flow for managing an MBS context and resource allocation by a central-unit ANN and a distributed-unit ANN.

Signaling Procedure Between CU, DU, and UE for Resource Allocation, Modification, and Release, and UE Delivery Mode Switching FIG. 5 illustrates an exemplary signaling message flow and procedure between the CU, the DU, and the UEs for effectuating MBS session context management, resource allocation/modification/release in the CU and DU for the various delivery instances described above to support the transmission of the MBS session to the UEs, and delivery mode switching of the UEs between the PTM delivery mode and the PTP delivery mode.

In some implementations, the CU receives MBS session context information from the core network as described above. The CU then makes initial resource allocation such as the mapping between the QoS flows in the MBS session to the MRBs. As shown in step 0 in FIG. 5, the CU further makes decisions related to the delivery mode for each of the UEs targeted by the MBS session based on the MBS session context information and information of the targeted UEs (as described later, such decisions may alternatively be made by the DU instead of CU). For example, the CU may decide a delivery mode for each of the targeted UEs. In some implementations, a subset of the targeted UEs may be attributed with the PTP delivery mode whereas another subset of the targeted UEs may be attributed with the PTM delivery mode. In some other implementations, all targeted UEs may be attributed with the PTP delivery mode. In yet some other implementations, all UEs may be attributed with the PTM mode. Some of the targeted UEs may be attributed to both the PTP delivery mode and the PTM delivery mode. In some other implementations, such decisions of delivery mode may be made by the CU or DU on the MRB granularity basis within each UE rather than for each of the UE as a whole. Step 1 thus achieves a synchronization of MBS context between the CU and the DU.

In step 1, as shown in FIG. 5, the CU initiates an MBS Context Setup message to DU, for transmitting the MBS context information to the DU. This message may further carry other information to enable the DU to perform the resource allocations and configurations for the various delivery instances autonomously or jointly with the CU. For example, the CU may transmit with this message the initial delivery mode decision for at least one UE or serving cells of the DU. As such, the information carried in the signaling message of step 1 may include, for example:

QoS information, such as QoS parameters for each MRB allocated by the CU for the MBS session and QoS parameters and identifications of the QoS flows mapped to each MRB.

Delivery mode for the UEs, or serving cells or delivering instances for receiving the MBS data, which may be the PTP delivery mode or the PTM delivery mode.

F1-U related information for transporting PDCP PDUs for the MRBs from the CU to the DU when an IP multicast is used. Such information may include, for example, an IP multicast address with or without source address and a GTP-TEID for a tunnel.

In step 2 the DU performs various resource allocations and configurations based on the information received from the CU of step 1, and sends a response message back to the CU. The response message may contain configuration information for successfully allocated lower layer resources for accepted MRBs for various delivery instances. The message may also contain an MRB list for MRBs failed to be created and corresponding reason of the failure.

In step 3, the CU receives the lower level configurations from the response message from the DU in step 2, generates an MBS radio resource configurations for the UEs, and transmit such MBS radio resource configurations to the UEs. Further in step 3 or in a separate step, the CU may generate an MBS receiving status report/feedback configuration for the UE, and sends the report/feedback configuration to the UE. The message in step 3 may be sent via broadcast or dedicated signaling. As such, the CU may dynamically configure how the UEs should provide feedback of the MBS session reception, including but not limited to the form, the content, the timing, and the triggering condition of the feedback.

In step 4, the UEs configure its protocol stack according to the MBS radio resource configuration from the CU to receive the MBS session data. The UEs further monitor various reception and channel parameters and provides status report or feedback to the CU, based on the form, content, timing, and triggering condition specified in the status report/feedback configuration of step 3 received from the CU. For example, the status report or feedback may be transmitted periodically, or triggered by predefined events, or both.

In some other implementations alternative or additional to step 4, the feedback from the UEs may be first sent to the DU, as shown in step 4a/1 and then as shown in step 4a/2, the DU generates and sends notification message to the CU, based on UE-provided report or feedback to the DU in step 4a/1.

In step 5, the CU modifies the MBS context information based on status report, or feedback, or notification from the DU or the UE, and transmitted the modified MBS context information and other relevant information to the DU using an MBS Context Modification or release message to effectuate modification or release of the resource allocations of the various delivery instances, and/or to effectuate a delivery mode switching of one or more UEs.

In step 6, the DU sends back MBS Context Modification or release response. The message may contain updated MRBs configuration for the MRBs successfully modified, and a MRB list for MRBs failed to be modified, as well as other information and other relevant configuration information of the various delivery instances. Subsequently, the CU may further send any modified radio resource allocation information to the UEs, similar to step 3.

The context release described above may be implemented in the following manner:
  DU may initiate MBS Context Release Request (DU initiated)
  CU may initiate MBS Context Release Request (CU initiated)

Other messages that are not included in the message flow of FIG. 5 may also be used to communicate various other information between the CU and the DU to assist in the allocations and configurations of the resources for the various delivery instances. These messages may include but are not limited to notification messages such as:
  A notification message to inform a certain UE that a requested QoS may not be satisfied.
  A notification message from UE to the DU, informing the DU that the UE is not capable to satisfying a certain condition, and triggering the DU to further notify the CU. This notification, for example, could be included in the information sent in step 4a/2 above.

The example procedure shown in FIG. 5 provides not only a mechanism for achieving an initial resource allocations and configurations for the delivery instances in the CU and the DU through CU-DU interactions, but also a UE feedback mechanism for achieving a delivery mode switching for one or more UEs. In particular, FIG. 5 provides a mechanism for the UE to dynamically provide reception status report or feedback to the CU, such that the CU or the DU may initiate a mode switch decision and perform corresponding modification of the delivery instances and the corresponding resource allocations to switch to a better delivery mode for transmitting the MBS session to the UE. Such switching and modification may be realized dynamically and based on the real time UE feedback.

Further, since the MBS context management and mode switch decision is originated and completed in the access network level, the delay introduced by the delivery mode switching between PTP and PTM for a UE is minimized, as compared to mode switching initiated in the application level which needs involvement of a greater number of higher layers and more network elements.

Signaling Information Exchange Between CU and DU

While each of the messages described above in the various steps in the signaling procedure of FIG. 5 are shown as implemented as one signaling message, the information contained in these steps may be transmitted via multiple signaling messages. The sequence of these steps may be arranged in a flexible manner for achieving the interactive communications of the MBS context and other information needed to enable the CU and the DU to perform the establishment, modification, and release of the resource allocations and configurations for the various delivery instances. These steps may be repeated in their entirety or repeated partially as needed.

Each of these messages may contain one or more information items interactively communicated among the CU, the DU, and the UE to effectuate the resource allocations and configurations of the delivery instances for transmitting the MBS session to the UEs. Such information items may be communicated for various purposes in the resource allocations and configurations, and for triggering various actions and responses from the CU or the DU. The disclosure below describes in more detail these information items and corresponding actions and responses by the DU and/or CU for achieving the dynamically reconfigurable resource allocations for the various delivery instances as illustrated in the exemplary configuration snapshot of FIG. 3.

Various information items may be exchanged from the CU to the DU after CU receives the MBS context from the core network, maps the QoS flows of the MBS session to MRBs, and determines the delivery modes for the UEs participating in the MBS session (as described later, such decisions may alternatively be made by the DU instead of CU). A message sent from the CU to the DU may include any one of the following data items:
  Operation indicator (e.g., setup operation, modification operation, release operation).

The MBS session identifier (more details are provided below).

MRB information corresponding to the MBS session, including, for example, the RB IDs of the MRB. The RB IDs corresponds to identifiers that may be used to uniquely identify the MRBs between the CU and the DU. Each RB ID may be represented by an index from an RB ID index space. An MRB may be further associated with a second RB ID for a particular UE to provide a mapping between the unique RB ID for the MRB and an RB ID used by UE for the same MRB in the case that the UE shares a RB ID index space with other MBS sessions or PDU sessions associated with the UE. The second RB ID will be used as the served radio bearer in the RLC bearer configuration corresponding to the MRB returned by the DU to the CU.

QoS parameters corresponding to MRBs.

QoS parameters or profiles of QoS flows mapped to the MRBs.

MBS capabilities of a UE.

Required UE capabilities related to the MBS session.

F1-U tunnel information corresponding to an MRB in one or more delivery instances. In some particular scenarios, an IP multicast address with or without source address and TEID may be included for the DU to join an IP multicast to obtain PDCP PDU for the MRB. Such an IP multicast data tunnel may be shared between one or more delivery instances or may be exclusive for a particular delivery instance for the particular MRB.

When the PDCP PDU for a MRB is transmitted from the CU to the DU in IP point-to-point transmission and no F1-U tunnel information from the CU is included for an MRB, the DU may respond with IP point-to-point transport information including IP address and TEID as destination information for a downlink F1-U tunnel for the MRB. The F1-U tunnel may be shared between one or more delivery instances or may be exclusive for a particular delivery instance for the particular MRB instances.

Uplink tunnel information for transmitting the PDCP layer status report of a particular MRB of a particular UE from the DU to the CU.

PDCP retransmission enable indication for a particular UE (optionally on the MRB basis or the MBS session basic). The DU establish RLC bearers for retransmission and returns configuration information to the CU.

List of failed MRBs and the reasons of failure in DU response for a delivery instance.

Configuration information corresponding to a delivery instance including the MAC/PHY configuration in DU response.

RLC mode for a PTP delivery instance, either the acknowledged mode (AM), Bidirectional unacknowledged mode (UM), Unidirectional UM uplink, or Unidirectional UM downlink.

RLC bearer configuration as a response from the DU after DU establishes RLC entity for an MRB for a delivery instance, in a form of RLC configuration, and logic channel ID (LCID). For an MRB in a PTM delivery instance, the RLC bearer may be associated with a UE-specific second LCID that may be returned from the DU to the CU in a response message, depending on whether the particular UE shares LCID space with other MBS sessions or PDU sessions associated with the UE.

A delivery mode indicator for UE (at MBS Session basis or at MRB basis).

UE ID or UE ID list for UEs with a PTP or PTM indication.

UE ID or UE ID list with a response from DU indicating PTP or PTM mode.

A cell ID or a cell ID list, optionally with UE ID list.

Cell ID and delivery instance ID, optionally with UE ID list.

A UE ID list with cell ID information.

The MBS session identifier above may be used to identify the MBS session and may be provided in at least one of the following forms:

Session ID: the MBS session ID in the session management procedure for a certain UE, which uniquely specifies a MBS session among multiple sessions including PDU Sessions for the UE, the session ID may be included in the SDAP configuration.

TMGI (Temporary Mobile Group Identity).

IP multicast address with source address.

IP multicast address without source address.

An interface MBS ID that uniquely identifies the MBS session within the CU-DU interface such as:
gNB-CU MBS F1AP ID: the gNB-CU MBS F1AP ID uniquely identifies the MBS association over the F1 interface within the gNB-CU.
gNB-DU MBS F1AP ID: the gNB-DU MBS F1AP ID uniquely identifies the MBS association over the F1 interface within the gNB-DU.

an identifier or index that can uniquely identify the MBS session within the CU or within the DU or within the F1 interface.

The UE ID above (either alone or in a UE ID list) may be used to identify the UE and may be provided in at least one of the following forms:
gNB-CU UE F1AP ID,
gNB-DU UE F1AP ID,
C-RNTI,
RAN UE ID,
an identifier or index that can uniquely identify the UE within the CU or within the DU or within the F1 interface.

CU-DU Interactions

This sections describes various exemplary interactions between the CU and the DU. In general, information items included in the signaling message sent from the CU to DU may trigger configuration actions in DU and/or trigger response from the DU. Some configuration decisions may be made by the CU. Some configuration decisions may be made by the DU. Some configuration decisions may be made either by CU or DU, or jointly by the CU and the DU.

In some implementations, the determination of the delivery mode for each UE in the UE group of the MBS session may be determined by the CU, as described above in relation to FIG. 5.

However, in some other alternative implementations, such decisions may be up to DU. For example, the CU may provide a UE ID list via the signaling message from the CU to the DU. The DU may then using information like UE connection status together with other information at DU like resource utilization or UE capability/MBS session requirement on UE capability to determine a delivery mode for each of the UEs and return such decision to the CU via a response signaling message. In other words, step in the signaling procedure of FIG. 5 may be performed by DU between step 1 and step 2, and the step labeled as "Decide delivery mode" between step 4*a*/2 and 5 may be performed by DU between step 4*a*/2 and step 5. For UEs associated with PTP mode, the DU may allocate resources for accepted MRBs for PTP delivery instances corresponding to the PTP UEs and returning their configuration information. The DU determines the serving cell for the PTM delivery instances for the UEs associated with PTM delivery mode. The DU further determines a number of PTM delivery instances in the determined serving cell for the PTM UEs, and performs resource allocations to these PTM delivery instances, and returns the resource configuration including the cell information and PTM delivery instance information (such as PTM delivery instance index or ID). The DU may further return UE ID list for UEs in each of the PTM delivery instances. In some implementations, for one MBS session, one PTM instance only is allocated for one particular cell. In such case, the PTM delivery instance ID may be the cell ID.

In some other implementations, assuming that the delivery mode for each of the UEs is determined by the CU, a determination of delivery instances distribution in the serving cell of the DU for the MBS session may be made either by the CU, the DU, or by the CU and DU jointly, using (but not limited to) the following alternatives:

- In one implementation, the CU may determine everything, including the number PTP delivery instances (number of UEs in PTP delivery mode) and the number of PTM delivery instances, and how many PTP delivery instances and how many PTM delivery instances there are in each serving cell of the DU. In such an implementation, the CU may send via various signaling message the UE list for the PTP delivery instances, the information about PTM instances in each cell to the DU. The DU, in response, may allocate corresponding resources for accepted MRBs and return the various configuration described above to the CU. Optionally, the information sent by the CU may include the entire UE list.
- In another implementation, the CU may merely send a UE ID or a UE ID list and indication of the delivery modes for these UEs. In response, the DU may allocate resources for accepted MRBs for PTP delivery instances corresponding to the PTP UEs and returning their configuration information. The DU determines the serving cell for the PTM delivery instances for the UEs associated with PTM delivery mode. The DU further determines a number of PTM delivery instances in the determined serving cell for the PTM UEs, and performs resource allocations to these PTM delivery instances, and returns the resource configuration including the cell information and PTM delivery instance information (such as PTM delivery instance index or ID). The DU may further return UE ID list for UEs in each of the PTM delivery instances. In some implementations, for one MBS session, one PTM instance only is allocated for one particular cell. In such case, the PTM delivery instance ID may be the cell ID.
- In another implementation, for the PTM delivery mode, the CU may send information to specify a PTM serving cell. In response, the DU may determine a number of PTM delivery instances in the serving cell, perform resource allocations to these PTM delivery instances, and return the resource configuration for PTM delivery instance information (including the PTM delivery instance ID). The DU further returns UE ID list for UEs associated with the PTM delivery instances if the CU include the UE ID list in its message to the DU. In some implementations, for one MBS session, one PTM instance only is allocated for one particular cell. In such case, the PTM delivery instance ID may be the cell ID.
- In another implementations, for the PTM delivery mode, the CU may send information to specify PTM serving cells and also PTM delivery instances therein. In response, the DU may perform resource allocations to these PTM delivery instances, and return the resource configuration for PTM delivery instance information (including the PTM delivery instance ID). Optionally, the CU may further include the UE ID list in its message to the DU for each PTM delivery instances.

In the embodiment above, the configuration information returned by the DU may include at least one (but not limited to) RLC bearer information for accepted MRBs for each delivery instance, MAC/physical information for each delivery instance, tunnel information for the CU to transmit the PDCP PDU to the DU, and the like. The RLC bearer configuration information for an MRB may include a unique RLC LCID and a first unique RB ID (unique between the CU and DU for the MBS session). The unique LCID is common for the UE group of the PTM delivery instance and included in the sub-header of the generated MAC PDU from the corresponding logical channel. Further, The RLC bearer configuration information may include, for a particular UE, a second LCID of the RLC bearer, in case the particular UE shares an LCID space with other MBS sessions or PDU sessions associated with the UE. Further, the RLC configurations information may include, for a particular UE, a second RB ID provided by the CU, the particular UE shares radio bearer space with other MBS sessions or PDU sessions associated with the UE In some implementations, the information items in the signaling message sent from the CU to the DU may include a retransmission enable indicator for a particular UE at either a delivery instance basis or an MRB basis, that is to say, to enable the retransmission for the delivery instance of the MBS session or only for the specified MRB list. In response, the DU may allocate resources for retransmission. For example, the DU may allocated additional RLC bearer for the particular UE and corresponding MRBs if the particular UE belongs to a PTM delivery instance. The DU may further establish downlink tunnel between the CU and the DU for each of such MRBs and for the particular UE. The DU may further return to the CU, in one or more response messages the configurations for the additional RLC bearers (e.g., additional LCIDs), the downlink retransmission tunnel information (e.g., IP address and TED).

In some implementations, the information items in the signaling message sent from the CU to the DU may include UE specific uplink tunnel information (e.g., on per MRB basis). In response, the DU sends UE status report to the CU based on such uplink tunnel information when needed.

Other information exchange, actions, and responses between CU and DU not included above in this section are described explicitly or implicitly in other sections and detailed embodiments within this disclosure.

In some implementations, the information items in the signaling message sent from the CU to the DU, or the DU to the CU further comprising: releasing resources in an resource allocation of all or list of the RBs associated with a delivery instance that are not shared by other delivery instances. For example, for a PTP delivery instance, the related RLC bearer configuration and possible F1-U resource for retransmission for the specific RB for the UE are released, while the F1-U tunnel for the RB which is shared among other delivery instances are not. For a PTM delivery instance, the related RLC bearer configuration and possible F1-U resource for retransmission for the specific RB for specific UE are released, while the F1-U tunnel for the RB which is shared among other delivery instances are not. The related MAC/PHY resources for the PTM delivery instance is released as well if the whole delivery instance is released instead of only a subset of the associated MRBs. In some implementations, such releasing indication is indicated by releasing resources in an resource allocation of all or list of the RBs associated with a UE that are not shared by other UEs, thus the UE specific resources for the RBs associated with the MBS session in the DU and the F1-U tunnel are released. In some implementations, such releasing is triggered by the UE-associated signaling, including UE Context Release Request (DU initiated) and UE Context Release Request (DU initiated). In some implementations, such releasing indication is indicated by releasing resources in an resource allocation of all or list of the RBs associated with a cell or cell list that are not shared by other cells. Consequently, the resources allocated for the PTM delivery in the cell including the associated RLC bearers, and F1-U tunnel associated with the MRB are released. The related MAC/PHY resources for the PTM delivery instance in the cell is released as well if all MRBs are released instead of only a subset of the associated MRBs.

Signaling Message Architecture

The various information items above that are conveyed between the CU, the DU, and the UEs may be organized and grouped as one or more signaling messages according to some predefined messaging format and one or more predefined message categories. For example, the request and response messages between the CU and DU via the F1 interface may include but are not limited to the categories of:

context setup request (CU to DU): for triggering DU to setup the MBS session context and allocate resources context setup request response (DU to CU): for DU to respond with accepted MRB information and rejected MRB information for one or more delivery instance, RLC bearer configuration (e.g., RLC configuration, LCIDs), MAC/PHY configuration information, delivery instance information, downlink PDCP PDU tunnel information, and the like)

context modification request (CU to DU): for triggering DU to modify the MBS session context and resource allocations context modification request response (DU to CU): for DU to respond with information similar to the context setup request response.

context modification request (DU to CU): for enabling DU to initiate context modification.

context modification confirm (CU to DU): response to context modification request from DU.

context release operation (CU initiated): for release of resource allocations for certain MBS sessions, or certain delivery instance (including PTP delivery instance for a particular UE, or PTM delivery instance targeted at a group of UE).

context release operation (DU initiated): for enabling DU to initiate release of resource allocations for certain MBS sessions, or certain delivery instance (including PTP delivery instance for a particular UE, or PTM delivery instance targeted at a group of UE).

notify (DU to CU): for DU to transmit QoS related notification to CU for MRBs for particular delivery instances, to inform the CU that the QoS of an already established GBR (Guaranteed Bit Rate) MRB cannot by fulfilled any longer or that it can be fulfilled again.

These categories of messages may be constructed with various levels and may, be transmitted, for example, to target resource allocations and configurations of one or more UEs, for a particular delivery instances, or for the MBS session.

In some implementations, the messages above may be constructed as UE-associated signaling messages (or per UE, or UE-specific signaling). In particular, each UE-associated message communicated from the CU to the DU is directed to a particular UE with context information and other information items described above for effectuating MBS session setup/modification/release, resource allocations and configuration pertaining to the particular UE. The DU correspondingly provides UE-associated response to the CU. Such type of signaling may be based on extension of the existing UE-associated signaling message scheme between the CU and the DU. The establishment, modification, and release of resources for delivering the MBS session data to all the UEs in the MBS group may be achieved by accumulatively communicating and processing the UE-associated signaling messages targeting each of the UEs in the MBS UE group.

Alternatively, the messages above may be constructed as MBS-associated signaling messages (or per-MB S, or MBS specific signaling) rather than UE-associated signaling messages. In particular, each MBS-associated message communicated from the CU to the DU may not be directed to a particular UE even though it contains information for effectuating the resource allocations and configurations for at least one UEs in the MBS UE group. The MBS-associated messages are directed to the MBS session and thus contain a collection of information items of the UEs. To implement such MB S-associated messaging, a particular procedure code space separate from those of the UE-associated procedure code space may be set aside for representing the various categories of messages above that are MBS-associated. A signaling message may carry a <Message Type> information element which contains a Procedure Code field pointing to the message categories related to the MB S-associated signaling message categories.

As such, and from a signaling architectural standpoint, the CU-DU messaging format may be designed in one of the following exemplary manners:

Signaling Messaging Format Embodiment 1: providing format for UE-associated signaling messages of different categories only between the CU-DU signaling.

Signaling Messaging Format Embodiment 2: providing MB S-associated signaling messages of different categories only between the CU-DU signaling.

Signaling Messaging Format Embodiment 3: providing formats both UE-associated and MB S-associated signaling messages between the CU-DU using separate procedure code spaces. In some example implementations, the various categories of requests and response above related to a PTP delivery instance for a particular UE may be carried using UE-associated signaling message formats whereas the various categories of requests and response above related to a particular PTM delivery instance may be carried using MBS-associated signaling message formats.

Example characteristics of the UE-associated signaling formats are described below. During the interaction between the CU and the DU on a MBS session context, to perform MBS session context management or operation on the F1 interface, a UE-associated signaling messages of the various categories above always targets a single UE. In other words, the CU and the DU use a per UE signaling unit.

A particular UE-associated signaling message may carry any of the relevant information items described above. For example a UE-associated signaling message may carry information items such as: MBS session context information identified by an MBS session ID, MRB information, which may include one or more of any of the following information items:

MBS session ID
MRBs corresponding to the MBS session. For each of the MRBs:
   MRB identifier (RBID) and possible a second RB ID specific to the UE
   QoS parameters of each MRB
   QoS parameters for QoS flow mapped to the MRB.
   Downlink F1-U tunnel information and possible a second Downlink F1-U tunnel for the UE for the MRB retransmission
Delivery mode for the targeted UE, such as PTP, PTM, or both.
F1-U tunnel information for additional tunnels for particular MRB(s) (e.g., UE-specific uplink tunnel for PDCP status report from the UE and/or UE-specific downlink tunnel for PDCP PDU retransmission) depending on a particular delivery characteristic.
RLC bearer configuration information for the UE.

Such UE-associated signaling messages are communicated between the CU and the DU and are collectively used by the CU and the DU to synchronize the MBS session context information. In other words, the exchange of information items between the CU and the DU may be based on multiple signaling interaction at various time accumulatively.

For example, if the DU receives a UE-associated MBS session context management and operation request targeting the DU for the first time, it creates a corresponding context for the MBS session based on the context information received. In a subsequent second UE-associated signaling message, for example, if the second UE-associated signaling message targets the same MBS session but a different second UE, and if the second signaling message includes MBS context operations for the same MBS, the DU then updates the MBS session context based on the message if needed. Specifically, a UE-associated signaling message 1 targeting UE1 carries the initial MBS session context. If at a later time, a UE-associated signaling message 2 targeting UE2 carries MRB QoS parameters and corresponding QoS Flow information for the same MBS session as in the UE-associated message 1, then the DU updates, according the UE-associated message 2, the existing MBS session context previously established based on the content of UE-associated message 1. For example, the DU may update its MBS UE list to include UE 2 with appropriate delivery mode information and association with other UEs in a same PTM group (if the UE is in PTM mode). Optionally, if the subsequent message 2 does not carry configuration information for the MBS session, then the DU maintains the current MBS session context content or configuration that was successfully created or modified last time. For example, after the DU creates the MBS context based on the MRB information in the UE-associated signaling message targeting UE 1, if some of its context such as MRB QoS parameters does not need to be updated, then a subsequent UE-associated signaling targeting UE2 may or may not carry the corresponding MRB QoS parameters. In such a manner, this implementation saves the signaling transport and processing overhead.

Any UE-associated-signaling message targeting the MBS session can operate on the MBS session context and configuration, which includes but not limited to the following information or a combination thereof:
The MRB attribute including its release and addition.
Modification of QoS parameters corresponding to the MRB, addition and removal of QoS flows mapped to the MRB.
Modification of PDCP configuration such as PDCP SN length, reordering timer, cipher and integrity protection configuration.

In some scenarios, the above operation as a result of a UE-associated signaling is applicable for all delivery instances of the MBS session associated with the DU. For example, in a delivery instance of the MBS session, a UE-associated signaling message updates the F1-U tunnel information corresponding to an MRB of the MBS session, if the corresponding MRB in multiple delivery instances of the MBS session share the same F1-U tunnel, then the update of the tunnel information applies to all other transmission instances sharing this F1-U tunnel.

Any UE-associated-signaling targeting a particular UE can operate on various aspects of the delivery instance associated with the particular UE in the MBS session, which includes but are not limited to the following information or a combination thereof:
delivery instance ID.
The F1-U tunnels associated with the delivery instance for the MRBs.
The configuration of the associated RLC bearer, and the control information corresponding to the delivery instance.
The MAC/PHY configuration set for the particular PTM delivery instance associated with the UE, including the delivery cell identity or particular PTM delivery instances in the cell.

For MBS-associated signaling messages that target a MBS session, a particular MBS-associated signaling message may carry any of the relevant information items described above. For example a MBS-associated signaling message may carry information items such as: MBS session context information identified by an MBS session ID, MRB information, which may include one or more of any of the following information items:
MBS session ID.
MRBs corresponding to the MBS session. For each of the MRBs:
   MRB identifier (RBID).
   QoS parameters of each MRB.
   QoS parameters for QoS flow mapped to the MRB.
   Downlink F1-U tunnel information.
Delivery mode for the targeted UE, such as PTP, PTM, or both.
F1-U tunnel information for additional tunnels for particular MRB(s) (e.g., UE-specific uplink tunnel for PDCP status report from the UE and/or UE-specific downlink tunnel for PDCP PDU retransmission) depending on a particular delivery characteristics.
RLC bearer configuration information for the delivery instances.
The MAC/PHY configuration set for the particular PTM delivery instance, including the delivery cell identity or particular PTM delivery instances in the cell. The delivery Such MBS-associated signaling messages are communicated between the CU and the DU and are collectively used by the CU and the DU to synchronize the MBS session context information. In other words, the exchange of information items between the CU and the DU may be based on multiple signaling interaction at various time accumulatively.

When the DU receives a MBS session context management and operation request for the first time, it creates a corresponding context for the MBS session. In subsequent MBS-associated signaling message, for example, if the subsequent MBS-associated signaling message targets the same MBS session, the DU then updates the MBS session context based on the subsequent MBS-associated message. In some scenarios, the MBS-associated signaling message may only trigger partial creation or update on the MBS session context.

The MBS-associated signaling message by CU may instruct the DU to perform context synchronization and/or resource allocation and configuration on either the MBS session basis, delivery instance basis, or on MRB basis. The MBS-associated signaling message may include various lists and tables of MRBs, UEs, and delivery instances with MRB, UE, or delivery instance-specific information specified by the lists or tables.

The disclosure below further provides a detailed description of the signaling message format embodiments 1-3 messaging architecture between the CU and the DU in achieving interactive resource allocations and configurations for various delivery instances.

Embodiment 1

In the first embodiment using UE-specific signaling (alternatively referred to as UE-associated signaling) only, the CU may make a decision (as described later, such decisions may alternatively be made by the DU instead of CU) that some UEs receive the MBS in PTP mode (group 1 UEs), whereas some UEs receive the MBS in the PTM mode (group 2 UEs). The CU uses the UE-associated F1 signaling, such as UE Context Setup or UE Context Modification messages and request the DU to allocate or modify or release corresponding resources and send back related configurations to DU. In this embodiment, the MBS session context management is always performed on a per UE basis. If CU needs to perform MBS session context management on multiple UEs, then multiple UE-associated signaling messages are transmitted and combined for effectuating resource allocations and configurations.

The UE-associated signaling for MBS session context setup or modification initiated from the CU contains at least the information items below along with the information items that may be returned by the DU in response messages. Since the UE-associated signaling is targeted to specific UE, part of the operation within the signaling therefore is specific for the UE only.

1. Information independent of delivery mode (PTP/PTM), including UE ID, MBS session ID, MRB QoS parameters and associated QoS parameters of the QoS flows:
    UE interface ID: gNB-CU UE F1AP ID, gNB-DU UE F1AP ID; and the MBS session ID or the MBS session ID list.
       DU response: gNB-CU UE F1AP ID, gNB-DU UE F1AP ID, the MBS session ID or the MBS session ID list.
    RB ID list for MRBs serving one of the MBS sessions, where the RB ID is the index of the MRB for the MBS, and optionally, the RB ID (RBID1) of each MRB is associated with the second RB ID (RBID2), if RB ID for the MBS and RB ID used by the UE use shared RB ID space among the MBS sessions and the PDU session associated with the UE.
       DU response: the first RLC bearer configuration information corresponding to each MRB, which includes the corresponding served RB ID which may be RBID1, or RBID2.
    For a specific MRB, its QoS parameters and the QoS parameters of the QoS flow mapped to the MRB.
    For a specific MRB, its downlink multicast address (with or without the source address) and the corresponding GTP-TEID (GPRS Tunneling Protocol Tunnel Endpoint Identifier). If the downlink tunnel information is allocated by DU for the MRBs,
       DU response: the first downlink tunnel information (IP address and associated GTP-TEID) corresponding to each MRB accepted by the DU.
    UE capability for the UE,
    UE capability requirement of the MBS session.
2. CU makes the decision on the delivery mode for the UE, and include the delivery mode indication in the information sent to DU. In another implementation, CU sends only the MBS session context to DU, and DU makes the decision on the delivery mode for the UE, and returns the configuration according to the delivery mode.
3. Message related to PTP mode request. The CU/DU interaction information includes PTP delivery mode indicator (if CU determines the delivery mode, and sends the indicator to DU), RLC entity mode, RLC bearer configuration which includes served RB ID. The CU to DU message instructs the DU to deliver all MRBs of the MBS session to the UE in PTP mode, or the DU to deliver a certain MRB or MRB list of the MBS session in PTP mode. The CU and DU message and the DU response further contains:
    RLC mode corresponding to the MRB, which may be acknowledged mode (AM), Bidirectional unacknowledged mode (UM), Unidirectional UM uplink, or Unidirectional UM downlink.
    Uplink tunnel information corresponding to each MRB of the MBS session.
    An indicator to enable or activate the retransmissions (such as PDCP retransmissions) for the MRB or MRB list of the MBS session.
       DU response: the corresponding second downlink tunnel information (DL-TNL2, including the IP address and associated GTP-TEID).
       DU response: DU to CU RRC information, which contains at least the above RLC bearer configuration.
    Upon receiving the request from the CU, the DU tries to allocate or modify resources per the request. The DU then sends response information to the CU to give feedback whether each RB is created successfully. Furthermore, for each MRB successfully created, the DU creates configuration for the particular RB and send the configuration back to the CU. For the MRBs that are failed on the corresponding operation, the DU response further includes: the MRB list of MRBs that are failed on the operation request, and the corresponding cause.
4. Message related to PTM mode request. The CU/DU interaction information includes PTM delivery mode indicator (if CU determines the delivery mode, and sends the indicator to DU. Otherwise, the DU determines the mode to the UE), PTM delivery cell, PTM delivery instance ID, first RLC bearer configuration, second RLC bearer configuration. There are several solutions for CU/DU messages (a PTM delivery cell is a cell that the MBS session is delivery in, particularly for the PTM delivery instance):

The CU message does not specify a PTM delivery cell, and does not specify a delivery instance ID. Only the MBS session context including the UE list with PTM delivery mode,
DU response: an PTM delivery cell or cell list, optionally, a PTM delivery instance ID corresponding to the PTM delivery cell, and optionally, a UE list corresponding to the delivery instance.

The CU message designated PTM delivery cell.

The CU message specifies the PTM delivery cell and does not specify the PTM delivery instance ID in the transmission cell.
DU response: optionally, the DU returns the PTM delivery instance ID in the transmission cell.

The CU message specifies the PTM delivery cell, and CU specifies the PTM delivery instance ID in the transmission cell.

The DU in the response message contains the MAC/PHY configuration corresponding to the PTM delivery cell or the delivery instance in the cell.

For each accepted MRB in the PTM delivery cell or PTM delivery instance of the MBS session:
DU response: configuration information of first RLC bearer corresponding to the MRB which further includes associated Logical Channel Identity LCID1. In some scenarios, the Logical Channel Identity may include LCID1 and LCID2.

The CU message further contains uplink tunnel information corresponding to the MRB.

The CU message further indicates the mode of the RLC entity corresponding to the MRB, which may be acknowledged mode (AM), Bidirectional unacknowledged mode (UM), Unidirectional UM uplink, or Unidirectional UM downlink.

The CU message may further enables or activates the retransmissions (such as PDCP retransmissions) for the MRB.
DU response: a corresponding second downlink tunnel information (DL-TNL2, including IP address and associated TEID) for particular UE. This tunnel may be used for PDCP retransmission or UE PDCP status report for particular UE.

DU response: the second RLC bearer configuration for particular UE and its logical channel identity LCID3, and marks LCID3 corresponding to the primary path, which is used to send the PDCP SR.

DU response: the list of MRBs for which the operation corresponding to the PTM delivery instance corresponding to the MBS session failed, and the corresponding reason.

Now refer to FIG. 4 for an exemplary delivery instances configuration for UEs under the DU. The DU is associated with at least 3 cells, and is associated with UE1 to UE10 in a MBS session context. The CU or the DU makes a decision on the UE delivery mode for the MBS. If CU makes the decision, CU sends the delivery mode associated with the UE to DU; if DU makes the decision, CU sends only the MBS session context to DU, and let DU make the decision, and the DU sends back the allocated resources configuration. In some implementation, CU provides only the UE information without the delivery more. Consequently, DU decide the delivery mode for the UE, for example, considering the connection status of the UE and the available radio resources, and also the UE capability for the UE, and also the UE capability requirement of the MBS session. In the response information from DU, DU provides the transmission cell information and possibly the delivery instance ID in the transmission cell, and the corresponding scheduling information including the MAC/PHY configuration set. Based on the interaction between the CU and the DU, there is an interaction result as shown in FIG. 4:

Cell 1—UE1, PTP
Cell 1—UE2 and UE3, PTM
Cell 2—UE4 and UE5, PTM
Cell 3—UE6, UE7, and UE8, PTM
Cell 3—UE9 and UE10, PTM It is obvious each cell may support multiple delivery instances of either PTP mode or PTM mode. In some embodiments, only one delivery instance is allowed for one cell.

In some embodiments, each delivery under PTP delivery mode, PTM delivery mode in different cells, and PTM delivery mode in a same cell all map to a different delivery instance. For every MRB is allocated at least one RLC entity on the DU side.

The message interaction between the CU and the DU, as well the information items carried in the message are further described below and are organized in several groups.

MBS Session Related Content

The CU initiates context management operations for a certain MBS session or a MBS session list to the DU using UE-associated signaling, the operation may be addition or modification of the MBS context, or the message contains the MBS session related context and its operation. The message is identified by gNB-CU UE F1AP ID, or optionally gNB-DU UE F1AP ID. A MBS session may correspond to one MBS or a category of MBSs, a MBS may be associated with multiple MBS sessions. The MBS session is identified by an MBS session ID.

The MBS session ID may be used to identify the MBS session and may be one of the following IDs or a combination thereof:
Session ID: the MBS session corresponds to the session ID in the session management mechanism of a certain UE, the session ID uniquely specifies a MBS session among multiple sessions of the UE, the session ID may be included in the SDAP configuration.
TMGI (Temporary Mobile Group Identity).
IP multicast address (with or without source address).
gNB-CU MBS F1AP ID: the gNB-CU MBS F1AP ID uniquely identifies the MBS association over the F1 interface within the gNB-CU.
gNB-DU MBS F1AP ID: the gNB-DU MBS F1AP ID uniquely identifies the MBS association over the F1 interface within the gNB-DU.
an identifier or index that can uniquely identify the MBS session in the CU or the DU or the F1 interface. An MBS session may correspond to one service or a category of services, whereas an MBS may be associated with multiple MBS session.

In the corresponding DU response message, the message uses gNB-CU UE F1AP ID, and gNB-DU UE F1AP ID to identify the associated F1 logic connection, the response message also contains MBS session ID.

In the same context management operation, the message further includes a MRB list contains MRBs serving the MBS, the first RB ID (RBID1) corresponding to each MRB in the MRB list, RBID1 is the index of all MRBs serving the MBS, based on the MBS session ID and RBID1, the MRB can be uniquely identified within the DU range or the CU range or on the F1 interface.

In some scenarios, the MRB is further associated with a second RB ID (RBID2), and the served radio bearer in the first RLC bearer configuration for the delivery instance within the DU response message is configured as the second RB ID (RBID2) in the CU for the UE. The service data received by the UE based on the RLC bearer is delivered to the PDCP entity identified by RBID2.

The operation further includes the QoS parameters of each MRB and the QoS parameters mapped to the QoS Flow of the MRB.

F1-U Tunnel Resource

In some embodiments, the DU receives the PTP or PTM delivery request from the CU for a certain MRB of a certain MBS session.

In some embodiments, the CU uses the MBS session as the granularity to request the DU to deliver the MBS session data to the UE in the PTP mode, that is, the CU requests the DU to deliver the service data of all MRBs of the MBS session in the PTP mode. Yet in some other embodiments, for example, when the air interface resources are limited or scarce, it is more desirable to include only data of specific MRB(s) instead of all MRB data of the MBS session in the PTP delivery mode. In this scenario, the CU requests the DU to deliver the specific MRB or MRB list of the MBS session in PTP mode.

In some embodiments, the DU receives request from the CU to use PTM delivery mode for the MBS session. For example, for the PTM delivery mode, MBS data is delivered based on the granularity of the MBS session.

Figure 6:
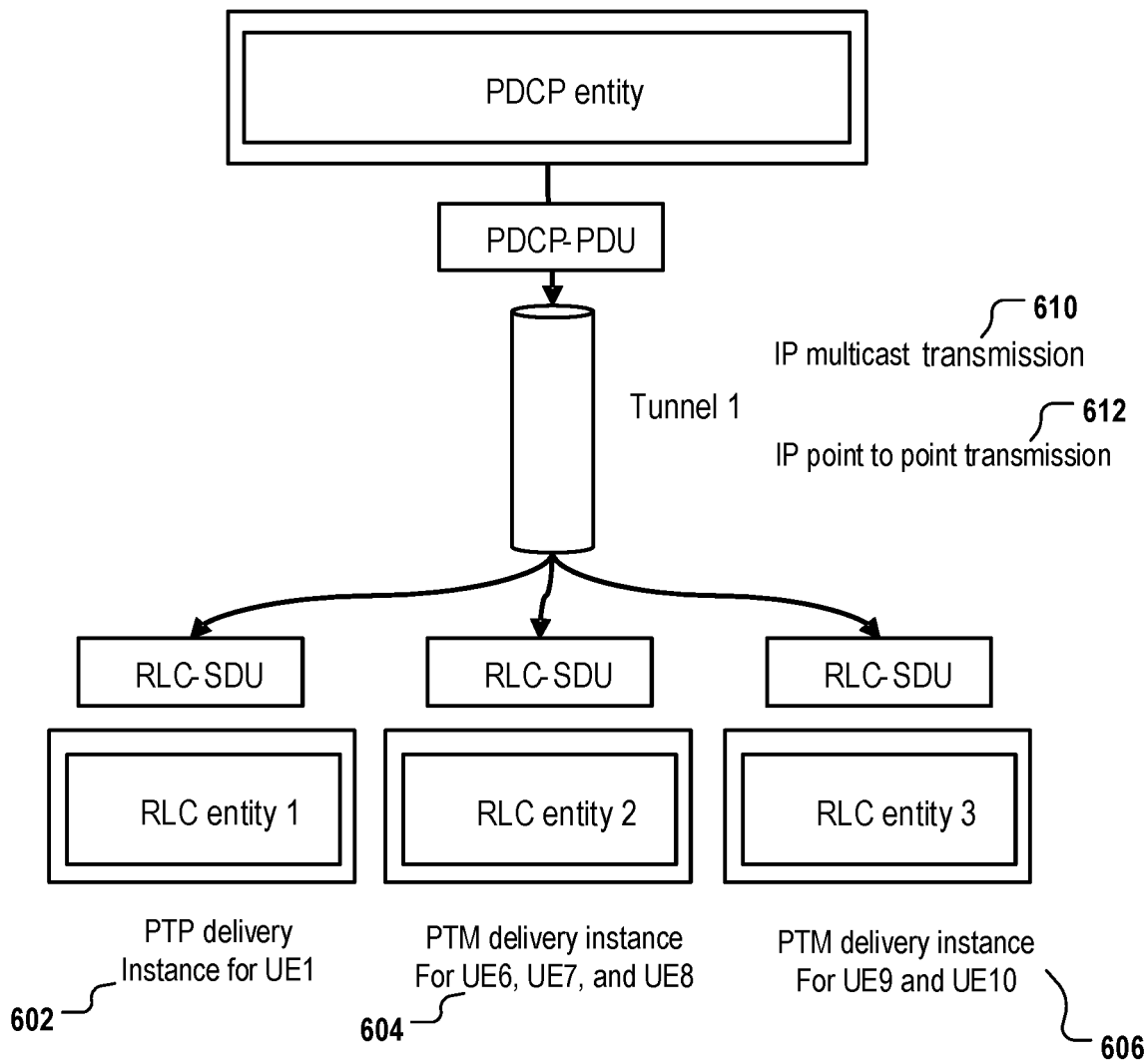
FIG. 6 shows an exemplary data tunnel configuration for transmitting PDCP PDU from a CU to the DU.

For a particular request as described above, regardless of the delivery mode, for a particular MRB, if the DU accepts the MRB delivery request for a MBS session from the CU:

In some embodiments, as shown in FIG. 6 (for illustrating downlink tunnel sharing for a particular MRB between some of the delivery instances of FIG. 4), the CU uses IP multicast 610 to transmit the MRB data to the DU in the tunnel's IP layer. The information sent by CU contains the IP multicast downlink tunnel information for the MRB, that is, the first IP multicast type downlink tunnel information. The DU then joins the IP multicast group and receive the MBS if any of the associated delivery instance accepts the MRB. Tunnel 1 is on top of IP layer based on IP multicast 610. Its tunnel information includes: IP multicast address, and optionally source address, and GTP-TEID. In this scenario, tunnel 1 is shared by multiple deliver instances, for example, PTP delivery instance for UE1 (602 of FIG. 6), PTM delivery instance for UE6, UE7, and UE8 (604 of FIG. 6), and PTM delivery instance for UE9 and UE10 (606 of FIG. 6). The MRB data is delivered from the CU to the DU using tunnel 1, then the DU submits the MRB data to multiple RLC entities (RLC entity 1, 2, and 3) to serve the corresponding delivery instances. FIG. 6 shows a data delivery example for one MRB but the same principle applies to other MRBs.

In some embodiments, as shown in FIG. 6, the CU uses IP point to point transmission 612 to transmit the MRB data to the DU. The F1-U tunnel information of the MRB is provided by the DU. If there is no previous delivery instance that accepts the MRB for the MBS session on the DU side or this is the first time that such MRB of the MBS session is setup in the DU, DU then allocates corresponding F1-U interface resource, which is the first downlink tunnel, and returns the corresponding first downlink tunnel information to the CU which includes IP address and associated GTP-TEID. It is further noted that once the MRB data is received by the DU from tunnel 1, the DU handles the rest of the data delivery task in the same manner as mentioned above. In this scenario, tunnel 1 is shared by multiple deliver instances, for example, PTP delivery instance for UE1 (602 of FIG. 6), PTM delivery instance for UE6, UE7, and UE8 (604 of FIG. 6), and PTM delivery instance for UE9 and UE10 (606 of FIG. 6). The MRB data is delivered from the CU to the DU using tunnel 1, then the DU submits the MRB data to multiple RLC entities (RLC entity 1, 2, and 3) to serve the corresponding delivery instances. FIG. 6 shows a data delivery example for one MRB but the same principle applies to other MRBs.

In some embodiments, if the DU has previously had a delivery instance including the MRB corresponding to the MBS session (including either PTP or PTM delivery instances), then the same MRB for the same MBS session shares the F1-U downlink tunnel, and DU returns the downlink tunnel information on the F1-U interface that has been established for the MRB of the MBS session, that is, the first DL tunnel. For example, in FIG. 6, multiple delivery instances (PTP transmission for UE1, PTM transmission for UE6, UE7 and UE8, and another PTM delivery instance for UE9 and UE10) share the same F1-U tunnel 1 for the same MRB. The PDCP PDU from the PDCP entity corresponding to the MRB is submitted to the RLC entities corresponding to multiple delivery instances after passing through the tunnel.

In some embodiments, MRBs use independent F1-U downlink tunnels, that is, for a certain MRB of the MBS session, on the corresponding F1 interface, based on different delivery instances, there are multiple independent F1-U tunnels. So based on the MBS session context management request, the DU returns independent tunnel information for the same MRB under different delivery instances. The tunnel created under this scenario is referred to as the first downlink tunnel under each delivery instance. For example, in FIG. 7 (for illustrating using independent downlink data tunnels for some of the delivery instances in FIG. 4), multiple delivery instances (PTP delivery instance for UE1, labeled as 702 in FIG. 7, PTM delivery instance for UE6, UE7 and UE8, labeled as 704 in FIG. 7, and another PTM delivery instance for UE9 and UE10, labeled as 706 in FIG. 7) use independent F1-U tunnels, namely tunnel 2, tunnel 3, and tunnel 4. At this time, after the PDCP PDU from the PDCP entity corresponding to the MRB is transmitted to the DU through the respective tunnels, it is submitted to the RLC entities corresponding to multiple delivery instances, for example, RLC entity 1, RLC entity 2, and RLC entity 3.

The following section describes the CU DU interaction to handle PTP related request.

Request Handling Related to PTP Delivery Mode and RLC Bearer Configuration

The CU message carries the RLC mode corresponding to the MRB, whether it is AM, Bidirectional UM, Unidirectional UM uplink, or Unidirectional UM downlink. After accepting the request that the corresponding MRB transmits in PTP mode, the DU establishes or modifies the configuration of the RLC entity corresponding to the MRB, and allocates corresponding MAC resources, such as logical channels, and returns the corresponding RLC bearer configuration in the response message. The RLC bearer configuration is included in the cell group configuration and further included in the DU to CU RRC information to be sent to the CU.

The CU message further carries the uplink tunnel information corresponding to the MRB. Specifically the IP address and the associated GTP-TEID. The uplink tunnel information may be used by the DU to establish an uplink tunnel. In some scenarios, this uplink tunnel is used to transmit the corresponding PDCP Status Report (PDCP SR) generated by the UE related to MRB data reception. This is shown in FIG. 8.

Figure 8:
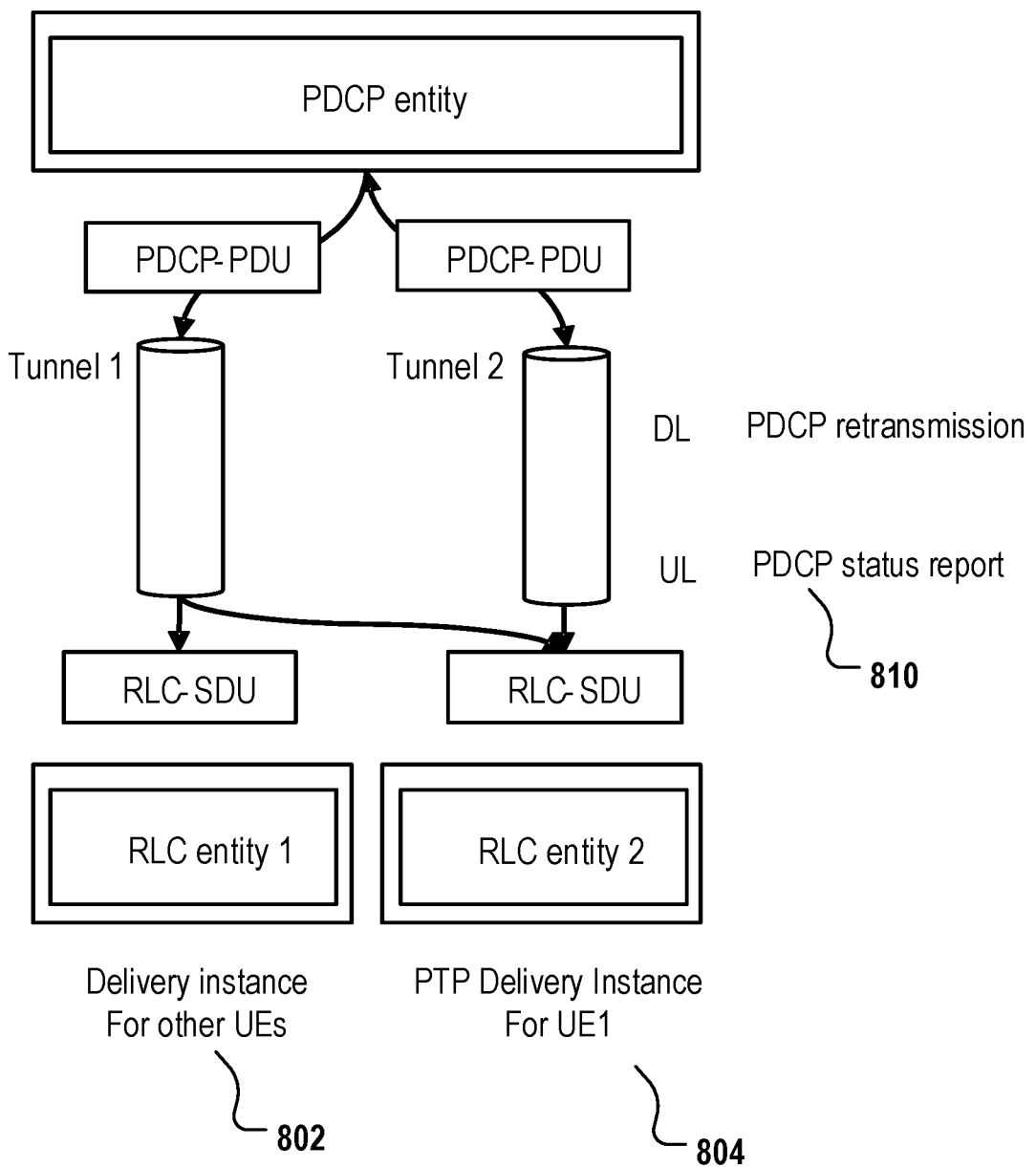
FIG. 8 shows another exemplary data tunnel configuration for transmitting and retransmitting PDCP PDU from a CU to the DU and transmitting PDCP status report of UE from the DU to the CU.

In more detail, FIG. 8 shows the tunnel configuration for a particular MRB in delivery instances 802 and 804, with data tunnel 1 and data tunnel 2. The delivery instance 804 may be a PTP delivery instance whereas the delivery instance 802 can be either a PTP or PTM delivery instance. As shown in FIG. 8, tunnel 1 is shared by the delivery instance 802 and 804 for the normal downlink transmission of the PDCP PDU of the MRB to the RLC entities for the MRB in the delivery instances 802 and 804, whereas tunnel 2 is established uplink PDCP SR 810 transmission to the CU.

Handling of PTP Retransmission Request

If the CU enables or activates the PDCP retransmission for the MRB, there may be different scenarios on how the F1-U downlink tunnel is shared:

In some embodiments, the CU uses IP multicast to transmit MRB data to the DU. Refer to FIG. 8 again. FIG. 8 further shows using tunnel 2 for retransmission for PTP delivery instance 804, which is shared with the uplink tunnel for transmitting PDCP SR. The information for tunnel 1 is provided by the CU whereas tunnel 2 information is provided by the DU. For the MRB data transmission, the initial data transmission for different delivery instances shares tunnel 1, the MRB data retransmission for PTP delivery instance 804 uses tunnel 2. For the PTP delivery instance 804, the initial data and re-transmitted data are both submitted to RLC entity 2 corresponding to the PTP delivery instance 804.

In some embodiments, the CU uses point-to-point to transmit MRB data to the DU. Refer to FIG. 8, both tunnel 1 and tunnel 2 information are provided by the DU. In this scenario, for the MRB data transmission, the initial data transmission for different delivery instances shares tunnel 1. For PTP delivery instance 804, the MRB data retransmission uses tunnel 2. The initial data and retransmitted data are both delivered to the same RLC entity corresponding the PTP delivery instance, which is RLC entity 2.

Figure 9:
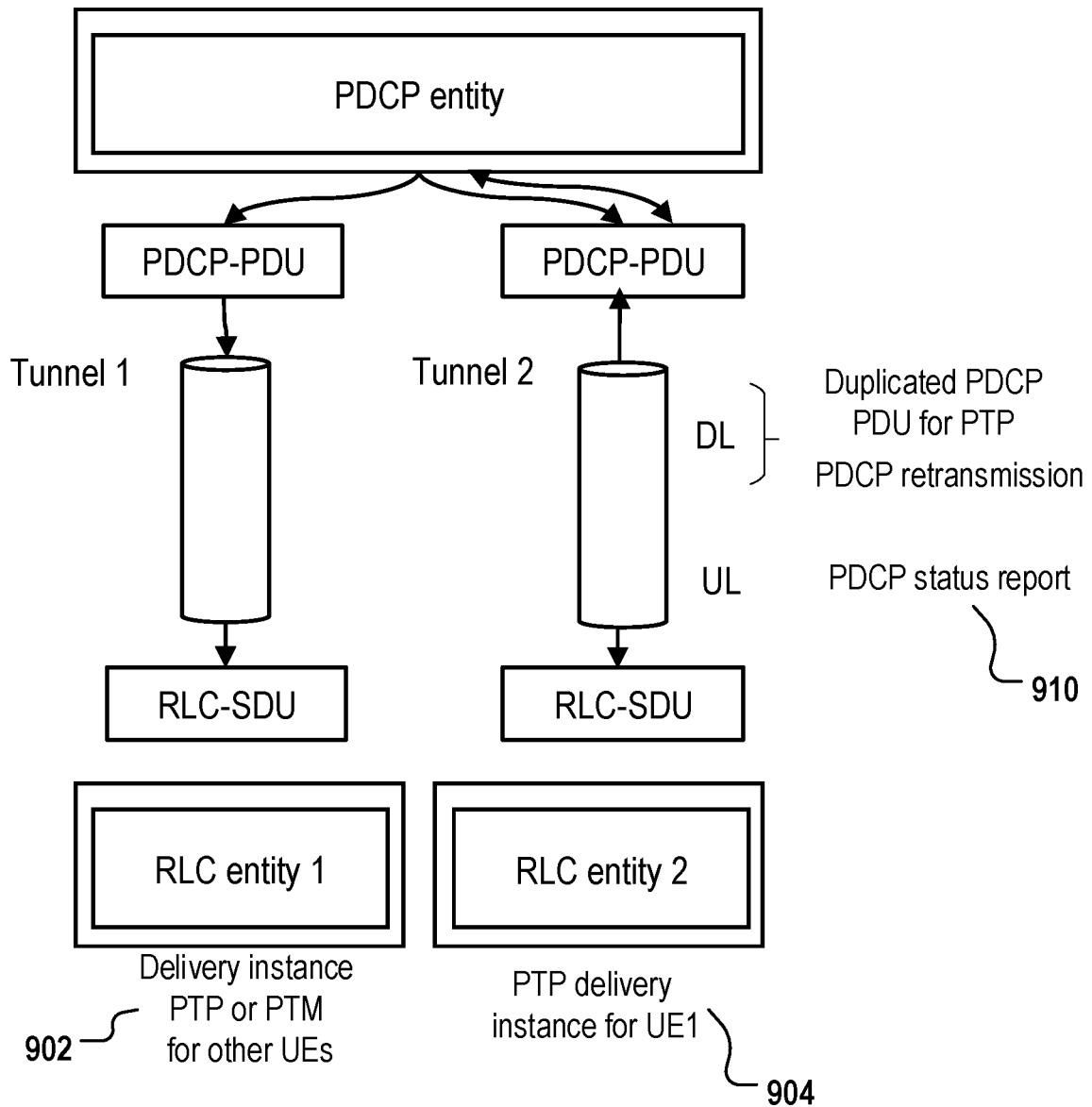
FIG. 9 shows another exemplary data tunnel configuration for transmitting and retransmitting PDCP PDU from a CU to the DU and transmitting PDCP status report of UE from the DU to the CU.

In some embodiments, the same MRB in different delivery instances uses independent tunnels. Refer to FIG. 9 (showing delivery instances using independent data tunnels 902 and 904 with respect to a particular MRB), the PTP delivery instance 904 for UE1 uses tunnel 2, whereas the delivery instance for other UEs use tunnel 1. For the PTP delivery instance 904 for UE1, the MRB data initial transmission and retransmission use the same tunnel, which is tunnel 2. In this scenario, tunnel 2 may be bi-directional. It can be used as downlink for MRB data initial transmission and retransmission. It can additionally be used as uplink for transmission of the PDCP SR corresponding to the MRB.

Handling DU Rejects the Creation of Some MRBs

For the CU message specifying PTP delivery mode for a UE, the DU may reject the creation or modification of one or more MRBs. In this case, DU returns back MRB list including the MRBs failed to be created or modified, and the failure reason.

The following section describes the CU DU interaction to handle PTM related request.

PTM Related Request—Cell Relate Information and Lower Layer Configuration Information Each PTM delivery instance always corresponds to specific transmission cell. Depending on different implementations, if the UE receives the MBS session is in a connected state, the context for the cell associated with the UE exists on both the CU and DU sides. The transmission cell information for PTM delivery instance may be provided by the CU or DU. In addition, if a certain MBS session is allowed to be transmitted in a certain cell based on multiple delivery instances, then for these delivery instances to be uniquely identified, it is needed to combine a cell identification, and a unique identification within the cell. Alternatively, on the F1 interface, for an MBS session, there is an identifier that can uniquely identify the delivery instance and its corresponding cell. The delivery instance identifier may be provided by the CU or the DU. In the following disclosure, the above different possibilities for the delivery instance identifier are disclosed in detail. Additionally, each PTM delivery instance corresponds to a MAC/PHY configuration set. Based on the configuration set, the UE can complete the reception of the MBS delivery instance in the time-frequency domain corresponding to the physical layer.

In some implementation, CU provides only the UE information without the delivery more. Consequently, DU decide the delivery mode for the UE, for example, considering the connection status of the UE and the available radio resources, and also the UE capability for the UE, and also the UE capability requirement of the MBS session. In the response information from DU, DU provides the transmission cell information and possibly the delivery instance ID in the transmission cell, and the corresponding scheduling information including the MAC/PHY configuration set.

In some implementation, the CU provides the UE information together with the corresponding delivery more, and the CU does not specify the cell information for PTM transmission for the MBS of the UE, whereas the DU includes the cell or cell list of the PTM transmission in the corresponding response message. Optionally, the DU further includes in the response message the PTM delivery instance ID corresponding to the transmission cell, and the scheduling information corresponding to the corresponding cell or the corresponding PTM delivery instance in the corresponding cell.

The CU may specify a transmission cell in the PTM transmission. Optionally, the CU further specifies the PTM delivery instance ID in the transmission cell.

In some scenarios, the CU specifies the cell information for the PTM transmission, and the DU optionally contains the PTM delivery instance ID of the corresponding transmission cell in the corresponding response message, and the scheduling information corresponding to the corresponding cell or the corresponding PTM delivery instance in the corresponding cell.

If the CU further specifies the cell information for the PTM transmission and the PTM delivery instance ID in the corresponding cell, the DU includes the scheduling information corresponding to the corresponding cell or the corresponding PTM delivery instance in the corresponding cell in the corresponding response message.

The above scheduling information includes: the MAC/PHY configuration corresponding to the PTM delivery instance, and may also include the following information or a combination of the following information:

DRX information corresponding to this PTM delivery instance

The Radio Network Temporary Identifier (RNTI) of the PTM delivery instance

Time domain scheduling information corresponding to the PTM delivery instance to indicate the subframe or slot where the PTM transmission is scheduled The frequency domain resource allocation information corresponding to the PTM delivery instance.

PDCCH (Physical Downlink Control Channel) configuration and the PDSCH (Physical Downlink Shared Channel) configuration corresponding to this PTM delivery instance.

The BWP (Bandwidth Part) information corresponding to the PTM delivery instance.

PTM Related Request, RLC Bearer Configuration

If the DU accepts the corresponding MRB transmission request in PTM mode, if the delivery instance specified by the CU or the DU does not exist, then based on the information from the CU message, such as PDCP SN, the DU establishes a corresponding RLC bearer. Otherwise if the PTM delivery instance already exists in the DU, the DU associates the UE with the PTM delivery instance and sends the corresponding first RLC bearer configuration to the CU according to the configuration corresponding to the existing delivery instance.

In some embodiments, if the DU accepts the corresponding MRB transmission request in PTM mode, the DU needs to include RLC bearer configuration information corresponding to each MRB for the MBS session, which includes the logical channel ID corresponding to the MRB, in the response message.

In another embodiment, if the DU accepts the corresponding MRB transmission request in PTM mode, then within the first RLC bearer configuration, the DU includes the RLC bearer configuration information corresponding to each MRB in the MBS session, which further includes the first logical channel ID1 (LCID1), and the associated second logical channel ID2 (LCID2). Among them, LCID1 is actually included in the MAC PDU generated by the DU in the actual PTM delivery, corresponding to the logical channel information in the sub-header of the MAC PDU that includes the corresponding MRB service data, whereas LCID2 is mapped to LCID1. After the UE receives a MAC PDU, the UE submits the data marked as LCID1 in the MAC PDU sub-hearer to the logical channel identified by LCID2 for further processing.

PTM Related Request—Handling PDCP SR and Retransmission

Figure 10:
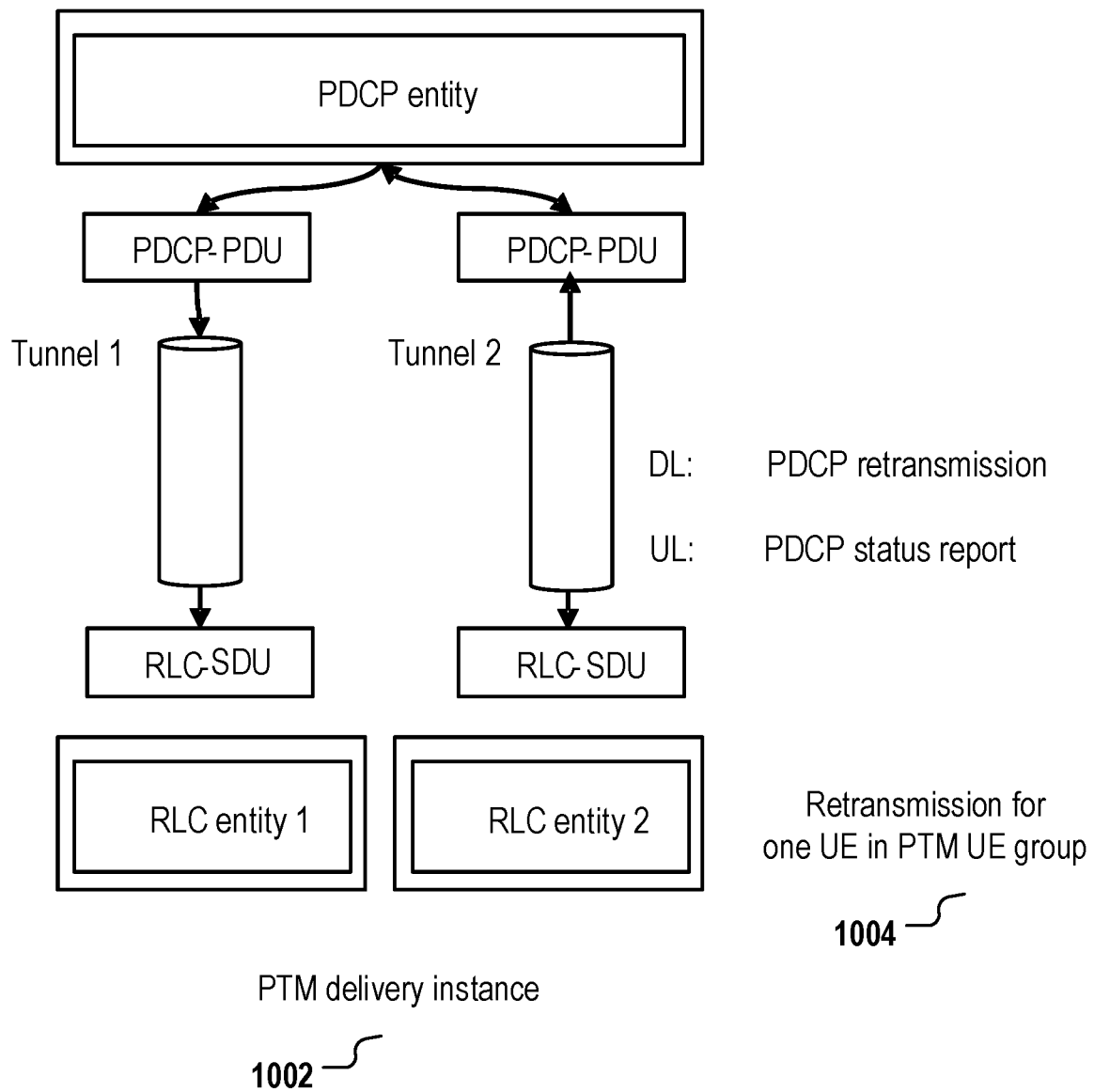
FIG. 10 shows another exemplary data tunnel configuration for transmitting and retransmitting PDCP PDU from a CU to the DU and transmitting PDCP status report of UE from the DU to the CU.

Refer to FIG. 10 (showing tunnel configuration for a PTM instance 1002 with respect to a particular MRB), in some scenarios, the network needs to enable PDCP SR for the MRB and/or PDCP data retransmission for the MRB in PTM delivery instance 1001 for a particular UE, using a bi-directional tunnel. The UE is configured with two independent RLC entities within the PTM delivery instance 1002: RLC entity 1, associated with tunnel 1, to perform the initial MRB data transmission in the PTM mode, and RLC entity 2 (labeled as 1004 in FIG. 10), associated with tunnel 2, to perform the retransmission of the MRB data, as well as the transmission of the PDCP SR corresponding to the MRB in the uplink, in the PTP mode. Tunnel 2 in this case is bi-directional.

The CU message further carries the uplink tunnel information corresponding to the MRB, specifically the IP address and the associated GTP-TEID. If the CU enables or activates the PDCP retransmission for the MRB, then the DU returns the second downlink tunnel information, including the IP address, and the associated GTP-TEID. Now the DU on the F1 interface contains information for two tunnels corresponding to the MRB. The first tunnel (Tunnel 1) may be used to transmit the initial transmission data corresponding to the MRB, and the second tunnel (Tunnel 2) is used to transmit the retransmission data corresponding to the MRB and the uplink PDCP SR.

The CU message further indicates the mode of the RLC entity corresponding to the MRB, whether it is acknowledged mode (AM), Bidirectional unacknowledged mode (UM), Unidirectional UM uplink, or Unidirectional UM downlink. After the DU accepts the corresponding MRB transmission request in PTM mode, the DU creates or modifies the RLC bearer corresponding to the MRB, allocates corresponding MAC resources, such as logical channels, and returns the corresponding second RLC bearer configuration in the response message. The RLC bearer configuration is included in the cell group configuration and further included in the DU to CU RRC information to be sent to the CU.

Handling DU Rejects the Creation of Some MRBs

For the CU message specifying PTM delivery mode for a UE, the DU may reject the creation or modification of one or more MRBs. In this case, DU returns back MRB list including the MRBs failed to be setup or modified, and the failure cause.

Handling Dual Mode Using Both PTP and PTM

In some embodiments, for a particular UE, the CU may request both PTP and PTM delivery mode. DU allocates corresponding resources, so the UE may be able to receive MRBs data in PTP and PTM mode simultaneously.

Embodiment 2

In this embodiment, the CU makes a decision that some UEs receive the MBS in PTP mode (group 1 UEs), whereas some UEs receive the MBS in the PTM mode (group 2 UEs). The CU uses the MBS-associated F1 signaling, such as MBS Context Setup or MBS Context Modification messages, to send the decision to the DU and request the DU to allocate or modify corresponding resources as well as related configurations. At meanwhile on the DU side, upon receiving the CU initiated MBS-associated message including the delivery mode information (PTP for specific UE, or PTM for specific UE or cell or instances in a cell), the DU allocate resources and create corresponding configuration. Based on whether each MRB is created successfully, the DU sends feedback message, including MRB configuration information, such as F1-U and RLC bearer configuration, as well as air interface resource allocation for the delivery instances corresponding to the MBS session. In this embodiment, the MBS session context management is always performed on a per MBS basis. This new mechanism is supported by the introduction of MBS-associated signaling in this disclosure.

In some implementations, the DU makes a decision that some UEs receive the MBS in PTP mode (group 1 UEs), whereas some UEs receive the MBS in the PTM mode (group 2 UEs). At meanwhile on the DU side, upon receiving the CU initiated MBS-associated message, the DU allocate resources and create corresponding configuration. Based on whether each MRB is created successfully, the DU sends feedback message, including MRB configuration information, such as F1-U and RLC bearer configuration, as well as air interface resource allocation for the delivery instances corresponding to the MBS session. In this embodiment, the MBS session context management is always performed on a per MBS basis.

For each MBS session, on the corresponding F1 interface, there may exists one F1 logic connection, used for context management between the CU and DU. In some scenarios, for all the MBS sessions, there is a unified signaling on the F1 interface which may be used to manage the contexts of a list of MBS sessions.

The MBS-associated message interaction between the CU and the DU, as well the information items carried in the message are further described below and are organized in several groups.

Basic Information, Independent with Delivery Mode, Includes Interface ID, MBS Session ID, MRB QoS Parameters and Associated QoS Flow Parameters
- gNB-CU MBS F1AP ID, gNB-DU MBS F1AP ID: the MBS session ID or session ID list.
  - DU response: gNB-CU UE F1AP ID, gNB-DU UE F1AP ID, the MBS session ID or a session ID list.
- Delivery mode description. This may include the whole MBS session, or the MRBs in a MRB list for this MBS session using PTP mode, together with the corresponding UE ID list, as well as a UE ID list for all the UEs using PTM mode, or cell list or instances list in the corresponding cell list using PTM mode.
- The UE ID may be one of the following identifier, or a combination of them: gNB-CU UE F1AP ID, gNB-DU UE F1AP ID, C-RNTI, or any other identifier or index that can uniquely identify the UE in the CU or DU or the F1 interface.
- MRB ID list for MRBs serving one of the MBS sessions, where the first RB ID (RBID1) corresponding to each MRB is the index of all MRBs for the MBS, and optionally, the CU provides a UE ID list contain all the UEs receive the MBS session, and optionally, for each of the UEs, the RB ID (RBID1) of each MRB is associated with the second RB ID (RBID2), if RB ID for the MBS and RB ID used by the UE use independent name space.
  - DU response: for each UE mentioned above, the first RLC bearer configuration information corresponding to each MRB of the MBS session, which includes the corresponding served RB ID which may be RBID1, or RBID2.
- For a specific MRB, its QoS parameters and the QoS parameters of the QoS flow mapped to the MRB.
- For a specific MRB, its downlink IP multicast address (and its source address) and the corresponding GTP-TEID. In case of the transmission of the MRB data using point to point delivery in the IP layer of the tunnel,
  - DU response: the first downlink tunnel information (IP address and associated GTP-TEID) corresponding to each MRB accepted by the DU. If there are multiple delivery instances for the MRB, then the accepted MRB list of each delivery instance may not be the same.
- the UE capability for the UE.
- the UE capability requirement of the MBS session.

Message Related to PTP Mode Request. The DU CU Interaction Information Includes PTP Delivery Mode Indicator, RLC Entity Mode, RLC Bearer Configuration which Includes Served RB ID
- For a UE using PTP mode as determined by the CU, the CU instructs the UE to receive all MRBs of the MBS session in PTP mode, or the UE receives a certain MRB or MRBs in a MRB list in PTP mode.
- The CU further indicates the RLC entity mode corresponding to the MRB, which may be acknowledged mode (AM), Bidirectional unacknowledged mode (UM), Unidirectional UM uplink, or Unidirectional UM downlink.
- The CU may further contain the uplink tunnel information corresponding to each MRB mentioned above (including an IP address and associated GTP-TEID).
- The CU may further enables or activates the retransmissions (such as PDCP retransmissions) for each MRB mentioned above.
  - DU response: the corresponding second downlink tunnel information (DL-TNL2, including the IP address and associated GTP-TEID).
  - DU response: DU to CU RRC information, which contains at least the above RLC bearer configuration.
  - DU response: the MRB list of MRBs failed operation request, and the corresponding reason.

Message Related to PTM Mode Request

The CU DU interaction information includes PTM delivery mode indicator, PTM delivery cell, PTM delivery instance ID, first RLC bearer configuration and corresponding RLC entity configuration, second RLC bearer configuration and corresponding RLC entity configuration.

In the request message, CU specifies using PTM mode to transport MBS session data. In the DU response message, there is a PTM delivery instance list, each delivery instance in the list may be further associated with a UE ID list. The information exchange between the CU and DU interaction is listed below:
- The CU request message includes a UE ID list, the list contains UEs using PTM delivery mode.
  - DU response: an optional PTM delivery cell or cell list, optionally, a PTM delivery instance ID corresponding to the PTM delivery cell, and optionally, a UE ID list corresponding to the delivery instance.
- The CU request message includes a cell list corresponding to PTM delivery mode, each cell in the cell list may be further associated with a UE ID list.
  - DU response: an optional PTM delivery cell or cell list, optionally, a PTM delivery instance list corresponding to the PTM delivery cell, and optionally, a UE ID list corresponding to the delivery instance.
- the UE capability for the UE.
- the UE capability requirement of the MBS session.
- The CU request message includes a cell list corresponding to PTM delivery mode, and PTM delivery instance list, each cell in the cell list may be further associated with a UE ID list, each delivery instance in the delivery instance list may be further associated with a UE ID list.
  - DU response: an optional PTM delivery cell or cell list, optionally, a PTM delivery instance ID corresponding to the PTM delivery cell, and optionally, a UE ID list corresponding to the delivery instance.

The DU response message includes the MAC/PHY configuration corresponding to the PTM delivery cell or the delivery instance in the cell.

For each MRB in the PTM delivery cell or PTM delivery instance of the MBS session, or for each MRB accepted in the CU request:
- DU response: configuration information of first RLC bearer corresponding to the MRB which further includes associated Logical Channel Identity LCID1.

In some scenarios, the Logical Channel Identity may include LCID1 and LCID2.

The CU further contains uplink tunnel information corresponding to the MRB.

The CU further indicates the mode of the RLC entity corresponding to the MRB, which may be acknowledged mode (AM), Bidirectional unacknowledged mode (UM), Unidirectional UM uplink, or Unidirectional UM downlink.

The CU may further enable or activate the retransmissions (such as PDCP retransmissions) for the MRB.

DU response: a corresponding downlink tunnel information (DL-TNL2, including IP address and associated TEID).

DU response: the second RLC bearer configuration and its logical channel identity LCID3, and marks LCID3 corresponding to the primary path, which is used to send the PDCP SR.

DU response: the list of MRBs for which the operation corresponding to the PTM delivery instance corresponding to the MBS session failed, and the corresponding cause.

Generally Applicable ID

An MBS session may correspond to one MBS or a category of MBSs. The MBS session ID may be used to identify the MBS session and may be one of the following IDs or a combination thereof:

Session ID: the MBS session corresponds to the session ID in the session management mechanism of a certain UE, uniquely specifies a MBS session among multiple sessions of the UE, the session ID may be included in the SDAP configuration.

TMGI (Temporary Mobile Group Identity).

IP multicast address (with or without source address).

gNB-CU MBS F1AP ID: the gNB-CU MBS F1AP ID uniquely identifies the MBS association over the F1 interface within the gNB-CU.

gNB-DU MBS F1AP ID: the gNB-DU MBS F1AP ID uniquely identifies the MBS association over the F1 interface within the gNB-DU.

an identifier or index that can uniquely identify the MBS session in the CU or the DU or the F1 interface.

In the corresponding DU response message, the message uses gNB-CU MBS F1AP ID, and optionally, gNB-DU MBS F1AP ID to identify the associated F1 logic link, the response message also contains MBS session ID.

General Applicable UE ID List

The CU request message further contains a description on delivery mode if CU decides which UE in the MBS session UE group is of which delivery mode.

The CU further includes the following delivery mode description in the request message, including the PTP delivery mode of the MBS session or the MRB list in the MBS session, the corresponding UE ID list; and the PTM delivery mode of the UE list corresponding to the MBS session. For example, in FIG. 4, UE1 uses PTP delivery mode; UE2-UE10 uses PTM delivery mode.

The above UE ID may be used to identify the UE and may be one of the following IDs or a combination thereof:

gNB-CU UE F1AP ID gNB-DU UE F1AP ID

C-RNTI an identifier or index that can uniquely identify the UE in the CU or DU or the F1 interface.

General—MRB ID Information

In the same context management operation, the message further includes a MRB list contains MRBs serving the MBS, the first RB ID (RBID1) corresponding to each MRB in the MRB list, RBID1 is the index of all MRBs serving the MBS. Based on the MBS session ID and RBID1, the MRB can be uniquely identified within the DU range or the CU range or on the F1 interface.

In some scenarios, the MRB is further associated with a second RB ID (RBID2), and the served radio bearer in the first RLC bearer configuration is set to the second RB ID (RBID2). The service data received by the UE based on the RLC bearer is delivered to the PDCP entity identified by RBID2 for processing.

The operation further includes the QoS parameters of each MRB and the QoS parameters mapped to the QoS flow of the MRB.

General—F1-U

In some embodiments, the DU receives the PTP or PTM transmission request from the CU for a certain MRB of a certain MBS session.

In some embodiments, the CU uses the MBS session as the granularity to request the DU to transmit the MBS session data to the UE in the PTP mode, that is, the CU requests the DU to transmit the service data of all MRBs of the MBS session in the PTP mode. In some embodiments, for example, when the air interface resources are limited or scarce, it is more desirable to include only data of specific MRB(s) instead of all MRB data of the MBS session in the PTP delivery mode. The CU requests the DU to transmit the specific MRB or MRB list of the MBS session in PTP mode.

In some embodiments, the DU receives request from the CU targeting PTM delivery mode for the MBS session. For example, under the PTM delivery mode, MBS data is transmitted based on the granularity of the MBS session.

For a particular request as described above, regardless of the delivery mode, for a particular MRB, if the DU accepts the MRB transmission request for a MBS session from the CU:

In some embodiments, as shown in FIG. 6 (downlink tunnel sharing), the CU uses IP multicast 610 to transmit the MRB data to the DU using tunnel 1. The CU message contains the IP multicast downlink tunnel information for the MRB, that is, the first downlink tunnel information. The tunnel information includes: IP multicast address, and optionally source address, and GTP-TEID. The DU then joins the IP multicast group and receive the MBS. Tunnel 1 is on top of IP layer based on IP multicast 610.

In some embodiments, as shown in FIG. 6 (downlink tunnel sharing), the CU uses IP point to point transmission 612 to transmit the MRB data to the DU. The F1-U tunnel information of the MRB is provided by the DU. If there is no previous delivery instance of an MRB for the MBS session on the DU side, the DU then allocates corresponding F1-U interface resource, which is the first downlink tunnel, and returns the corresponding first downlink tunnel information to the CU which includes IP address and associated GTP-TEID.

In some embodiments, if the DU has previously had a delivery instance for the MRB corresponding to the MBS session (including PTP or PTM delivery instances), then the same MRB for the same MBS session shares the F1-U downlink tunnel, and DU returns the downlink tunnel information on the F1-U interface that has been established for the MRB of the MBS session, that is, the first downlink tunnel. For example, in FIG. 6, multiple delivery instances (PTP transmission for UE1, PTM transmission for UE6, UE7 and UE8, and another PTM delivery instance for UE9 and UE10) share the same F1-U tunnel 1 for the same MRB. The PDCP PDU generated by the PDCP entity corresponding to the MRB is submitted to the RLC entities (RLC entity 1, 2, and 3) after passing through the tunnel, and is further delivered to the corresponding delivery instance.

In some embodiments, MRBs use independent F1-U downlink tunnels, that is, for a certain MRB of the MBS session, on the corresponding F1 interface, based on different delivery instances, there are multiple independent F1-U tunnels. So based on the request, the DU returns independent tunnel information for the MRB, which is the first downlink tunnel. For example, in FIG. 7 (independent downlink data tunnel), multiple delivery instances (PTP transmission for UE1, PTM transmission for UE6, UE7 and UE8, and another PTM delivery instance for UE9 and UE10) use independent F1-U tunnels, namely tunnel 2, tunnel 3, and tunnel 4. The PDCP PDU generated by the PDCP entity corresponding to the MRB is submitted to the RLC entities (RLC entity 1, 2, and 3) after passing through each tunnel, and is further delivered to the corresponding delivery instance.

Message Related to PTP Request and RLC Bearer Configuration

The CU message instructs the UE to receive the MBS session in PTP mode, or the UE receives a certain MRB or MRB list of the MBS session in PTP mode. For this UE and the MRB accepted by the DU:

The CU message further indicates the RLC entity mode corresponding to the MRB, which may be AM or UM. If the DU accepts the corresponding MRB transmission request in PTP mode, the DU creates or modifies the RLC entity corresponding to the MRB, allocates corresponding MAC resources, such as logical channels, and returns the corresponding second RLC bearer configuration in the response message. The RLC bearer configuration is included in the cell group configuration and further included in the DU to CU RRC information to be sent to the CU.

The CU message further instructs the uplink tunnel information corresponding to the MRB. Specifically the IP address and the associated GTP-TEID. In some scenarios, the F1-U tunnel is used to transmit the corresponding PDCP Status Report (PDCP SR) generated by the UE related to MRB data reception. As shown in FIGS. 8 and 9, for the UE1, the PDCP status report 810 and 910 of the MRB is transmitted to the network side, that is, the PDCP entity in the CU, through tunnel 2.

If the CU enables or activates the PDCP retransmission for the MRB, there may be different scenarios on how the F1-U downlink tunnel is shared:

In some embodiments, the CU uses multicast to transmit MRB data to the DU. Refer to FIG. 8, tunnel 1 information is provided by the CU whereas tunnel 2 information is provided by the DU. For the MRB data transmission, the initial data transmission for different delivery instances shares tunnel 1.

In some embodiments, the CU uses point-to-point to transmit MRB data to the DU. Refer to FIG. 8, both tunnel 1 and tunnel 2 information are provided by the DU. For the MRB data transmission, the initial data transmission for different delivery instances shares tunnel 1. For UE1, the MRB data retransmission uses tunnel 2. The initial data and retransmitted data are both delivered to the RLC entity2 corresponding the PTP delivery instance for UE1.

In some embodiments, the same MRB in different delivery instances uses independent tunnel. Refer to FIG. 9 (independent tunnels for delivery instances 902 and 904), the delivery instance for other UEs use tunnel 1 associated with RLC entity 1, whereas the PTP delivery instance for UE1 uses tunnel 2 associated with RLC entity 2. For UE2, the MRB data initial transmission and retransmission share tunnel 2. In this scenario, tunnel 2 is bi-directional as it can also be used as uplink tunnel for transmission of the PDCP SR corresponding to the MRB.

Handling DU Rejects the Creation of Some MRBs

For the CU message specifying PTP delivery mode for a UE, the DU may reject the creation or modification of one or more MRBs. In this case, DU returns back MRB list including the MRBs failed to be created or modified, and the failure cause.

The CU message may further contain the uplink tunnel information corresponding to each MRB mentioned above.

PTM Related Request

Since this embodiment is based on per MBS signaling, the main difference with embodiment 1 is that the per MBS signaling may carry or not carry any UE information to indicate operation or configuration to a specific UE, or implicitly a group of UE.

Each PTM delivery instance always corresponds to a specific transmission cell. Depending on different implementations, if the UE receives the MBS session is in a connected state, the context for the cell associated with the UE exists on both the CU and DU sides. The transmission cell information may be provided by the CU or DU. That is, the CU may only provide the UE list containing UEs using PTM mode, and the DU determines the cell or cell list corresponding to the PTM transmission according to the UE connection status or other information, and further, the delivery instance ID in each cell.

For example, in one embodiment, a certain MBS session is allowed to be transmitted in a certain cell based on multiple delivery instances. Further, these delivery instances may need to uniquely specify the delivery instance in combination with the cell identifier and a unique identifier in the cell, or characterized by the unique delivery instance ID in the DU. For example, in one embodiment, UE6, UE7, and UE8 may correspond to the first delivery instance in cell 3, and UE9 and UE10 may correspond to the second delivery instance in cell 3.

The CU further includes the following reception mode description in the request message, and indicating transmitting the service data of the MBS session in PTM mode. The DU response message contains a list of PTM delivery instances for multiple possibilities, and each delivery instance may be further associated with a list of UE IDs.

In one scenario, in the PTM transmission request, the CU includes a UE ID list associated with the PTM delivery mode, and the CU does not specify cell information or delivery instance ID in the corresponding cell for PTM transmission for the MBS of the UE. Upon receiving the request, the DU generates the corresponding scheduling results, such as which cells in the DU should PTM transmission take place, as well as mapping the cell with the delivery instance ID, based on each cell to which each UE is connected and the connection status of the UE in each cell. Based on the scheduling result, the DU includes an optional PTM delivery cell or cell list in the response message, or alternatively, a PTM delivery instance ID corresponding to the PTM delivery cell, and optionally a UE ID list corresponding to the delivery instance. In addition, The DU also provides scheduling information corresponding to the cell or delivery instance.

In one scenario, in the PTM transmission request, the CU includes a cell list associated with the PTM delivery mode, each cell in the cell list may be associated with a UE ID list. The CU designates PTM transmission in a cell. Optionally, the CU provides a UE ID list associated with PTM transmission. Upon receiving the request, based on the UE ID list, the DU allocates multiple delivery instances associated with the cell to support the PTM transmission request. Based on the scheduling result, the DU includes an optional PTM delivery cell or cell list in the response message, or alternatively, a PTM delivery instance ID corresponding to the PTM delivery cell, and optionally a UE ID list corresponding to the delivery instance. In addition, The DU also provides scheduling information corresponding to the cell or delivery instance.

In one scenario, in the PTM transmission request, the CU includes a cell list associated with the PTM delivery mode, and a delivery instance ID list associated with each cell in the cell list, each delivery instance may be further associated with a UE ID list. That is, the CU specifies the cell and delivery instance ID associated with the PTM transmission. Upon receiving the request, based on the connection status of the UE, the DU generates the scheduling parameters associated with each delivery instance in each cell. Based on the scheduling result, the DU includes an optional PTM delivery cell or cell list in the response message, or alternatively, a PTM delivery instance ID corresponding to the PTM delivery cell, and optionally a UE ID list corresponding to the delivery instance. In addition, The DU also provides scheduling information corresponding to the cell or delivery instance.

The above scheduling information includes: the MAC/PHY configuration corresponding to the PTM delivery instance, and may also include the following information or a combination of the following information:
  DRX information corresponding to this PTM delivery instance
  The Radio Network Temporary Identifier (RNTI) of the PTM delivery instance
  Time domain scheduling information corresponding to the PTM delivery instance to indicate the subframe or slot where the PTM transmission is scheduled
  The frequency domain resource allocation information corresponding to the PTM delivery instance.
  PDCCH (Physical Downlink Control Channel) configuration and the PDSCH (Physical Downlink Shared Channel) configuration corresponding to this PTM delivery instance.
  The BWP (Bandwidth Part) information corresponding to the PTM delivery instance.
PTM Related Request, RLC Bearer Configuration For every delivery instance, if the DU accepts the corresponding MRB transmission request in PTM mode, and the delivery instance specified by the CU or the DU does not exist, then based on the information from the CU message, such as PDCP SN, the DU creates a corresponding RLC entity. Otherwise if the PTM delivery instance already exists in the DU, the DU sends the corresponding first RLC bearer configuration to the CU according to the configuration corresponding to the existing delivery instance.

In some embodiments, if the DU accepts the corresponding MRB transmission request in PTM mode, the DU needs to include RLC bearer configuration information corresponding to each MRB for the MBS session, which includes the logical channel ID corresponding to the MRB, in the response message.

In some embodiments, for every UE-associated with the delivery instance:
  If the DU accepts the corresponding MRB transmission request in PTM mode, then within the first RLC bearer configuration, the DU includes the RLC bearer configuration information corresponding to each MRB in the MBS session, which further includes the first logical channel ID1 (LCID1), and the associated second logical channel ID2 (LCID2). Among them, LCID1 is included in the MAC PDU generated by the DU in the actual PTM delivery, corresponding to the logical channel information in the sub-header of the MAC PDU corresponding to the MRB service data. After the UE receives a MAC PDU, the UE submits the data marked as LCID1 in the sub-hearer of the MAC PDU to the logical channel identified by LCID2 for further processing.
  In some scenarios, the network enables PDCP data retransmission for the MRB in PTM transmission for the UE, using a bi-directional tunnel. The UE relies on two independent RLC entities: RLC entity 1 to perform the initial MRB data transmission in the PTM mode, and an UE specific RLC entity 2 to perform the retransmission of the MRB data, as well as the transmission of the PDCP SR corresponding to the MRB.
  The CU message further indicates the uplink tunnel information corresponding to the MRB, specifically the IP address and the associated GTP-TEID. In some scenarios, the F1-U tunnel is used to transmit the corresponding PDCP SR generated by the UE when receiving the MRB data. As shown in FIG. 10, tunnel 2 is used for the uplink transmission of the PDCP SR.
  If the CU enables or activates the PDCP retransmission for the MRB, then the DU returns the second downlink tunnel information, including the IP address, and the associated GTP-TEID. Now on the F1 interface there are two downlink tunnels corresponding to the MRB. The first downlink tunnel may be used to transmit the initial transmission data corresponding to the MRB, and the second downlink tunnel may be used to transmit the retransmission data corresponding to the MRB and the uplink PDCP SR.
  The CU further indicates the mode of the RLC entity corresponding to the MRB, whether it is AM or UM. After the DU accepts the corresponding MRB transmission request in PTM mode, the DU creates or modifies the RLC entity corresponding to the MRB, allocates corresponding MAC resources, such as logical channels, and returns the corresponding second RLC bearer configuration in the response message. The RLC bearer configuration is included in the cell group configuration and further included in the DU to CU RRC information to be sent to the CU.
Handling DU Rejects the Creation of Some MRBs For the CU message specifying PTM delivery mode, the DU creates PTM delivery instance, or a PTM delivery instance list. For each delivery instance, the DU may reject the creation or modification of one or more MRBs due to resource or other reasons. In this case, DU returns back an MRB list including the MRBs failed to be created or modified, and the failure reason.
Handling Dual Mode Using Both PTP and PTM In some embodiments, for a particular UE, the CU may request both PTP and PTM delivery mode. DU allocates corresponding resources, so the UE may be able to receive MRBs data in PTP and PTM mode simultaneously.

Embodiment 2 Example

Refer to FIG. 4 for an exemplary CU decision on UE delivery mode for a MBS session. Based on the CU decision, UE1 uses PTP delivery mode, UE2 to UE5 use PTM delivery mode. In some scenarios, CU further decides that some UEs such as UE2 and UE3 use PTM delivery mode in one cell under the DU, and UE4 and UE5 use PTM delivery mode in another cell under the DU. The specific signaling may or may not carry the corresponding UE ID list. In some scenarios, DU may implement multiple PTM delivery instances in a cell, based on the interaction with the CU.

In some scenarios, the CU does not determine in which cell the PTM delivery instance exists, but instructs certain UE to receive using PTM or PTP mode. At this time, the DU decides how many PTM delivery instances to generate and the related cells. In some scenarios, the DU may generate multiple PTM delivery instances in a cell.

In addition, the PDCP PDU generated for the corresponding PDCP corresponding to the MBS can be delivered to the DU through a shared tunnel, or can be delivered to the DU through an independent tunnel.

The following describes the above scenarios separately. The configuration for each UE may not be presented in the same F1 signaling at the same time as the configuration may be presented in different F1 signaling at different time points.

After receiving the decision from the CU, the DU makes the MBS reception scheduling for each UE, and allocates resources for the bearer corresponding to each delivery instance. In the case of resource allocation failure, the DU sends a feedback to the CU with a failure reason.

In the context setup or modification request message sent by the CU, the gNB-CU MBS-AP ID is used to uniquely identify the MBS session on the CU side over the F1 interface. These signaling messages may further carry the MBS session ID or the MBS ID corresponding to the MBS, such as an IP multicast address, to inform the DU of the MBS identification.

In addition, the signaling further carries QoS parameters corresponding to the MRB or MRB list serving the MBS. Each MRB is identified by an RB ID. The signaling further includes a QoS flow list mapped to the MRB, and its corresponding QoS flow level QoS parameters, including QoS Flow Identifier (QFI).

The CU may instruct a specific UE or UE list to receive specific MRB(s) or the entire MBS in PTP mode in the signaling message. The entire MBS indicates all the corresponding MRBs associated with it. The UE list may be identified by the gNB-CU UE F1AP ID or gNB-DU UE F1AP ID of the UE on the F1 interface.

The signaling may further carry the RLC entity mode corresponding to a specific MRB for a specific UE, which may be AM or UM mode. For example, if the QoS requirements corresponding to a MRB of a MBS are not sensitive to delay, but require high reliability, then the corresponding RLC entity may be configured in AM mode. On the other hand if the QoS requirements are sensitive to delay, then the corresponding RLC entity may be configured in UM mode. Refer to FIGS. 8 and 9, in some scenarios, for UE1, an uplink tunnel shown as tunnel 2 needs to be established to transport uplink data, for example, feedback information such as PDCP Status Report generated by UE1 related to MRB data reception. In this case, the signaling may further carry the user plane uplink tunnel address corresponding to the specific MRB for UE1.

After receiving the CU request, if the DU can allocate the corresponding resources, then in the returned response message, the DU returns the downlink tunnel information for the specific MRB of the UE in the above request. Refer to FIG. 8, tunnel 2 is now established successfully and can be used to transmit service data corresponding to the bearer that is transmitted to the UE in PTP mode, and can also be used to transmit PDCP PDU retransmission data for a specific UE.

Figure 7:
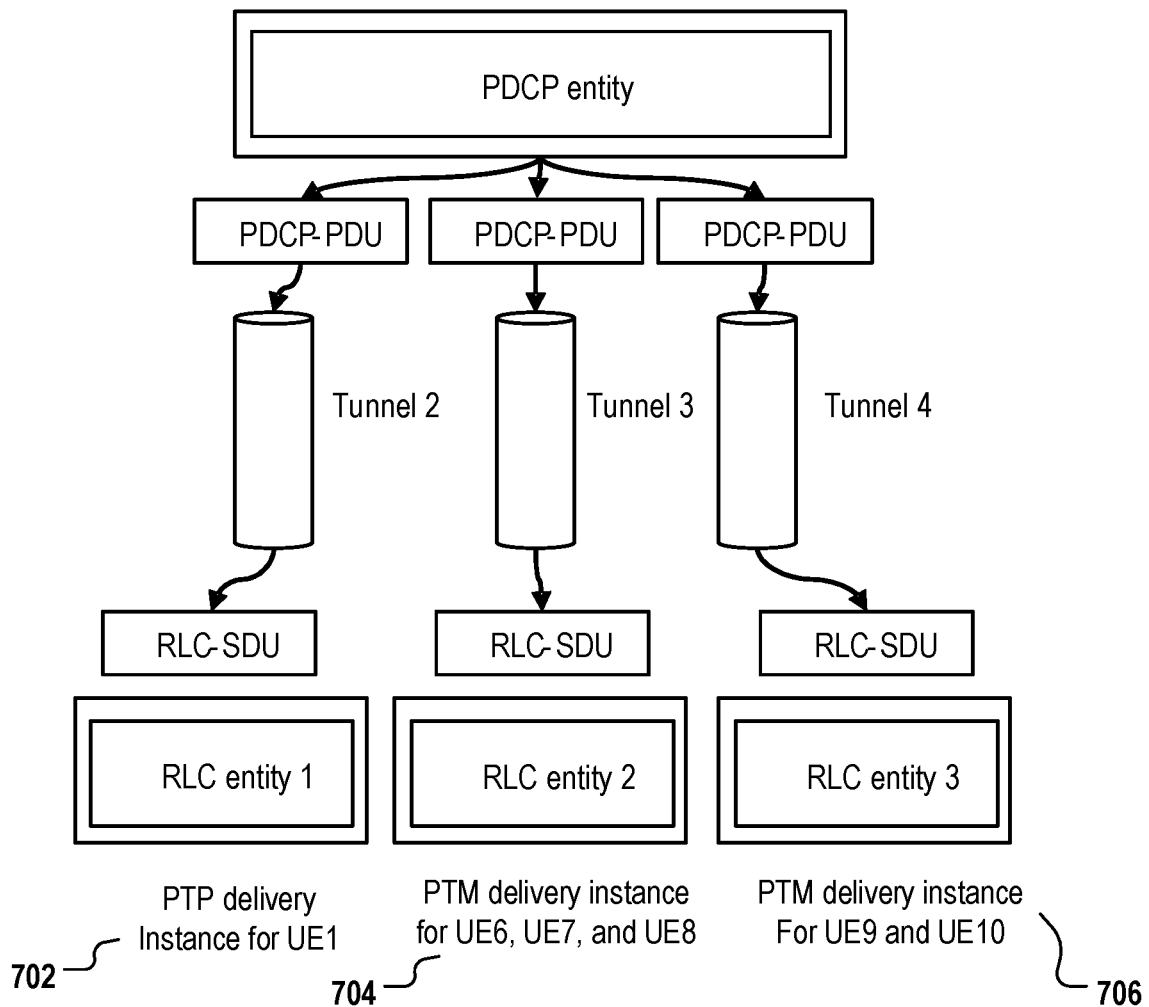
FIG. 7 shows another exemplary data tunnel configuration for transmitting PDCP PDU from a CU to the DU.

In some scenarios, the CU carries an IP multicast address for transmitting the PDCP PDU corresponding to the MRB corresponding to the MBS. After receiving the IP multicast address, the DU joins the multicast group and receives the multicast service data. Refer to FIGS. 6 and 7, RLC entity 1, RLC entity 2, and RLC entity 3 are associated with the same MRB and share tunnel 1, the service data is submitted to RLC entity 1, RLC entity 2, and RLC entity 3 simultaneously.

In some scenarios, the DU replies with downlink tunnel information for the MBS as a response to the above request, so a downlink tunnel from CU to DU may be created. The PDCP PDU corresponding to the MRB of the MBS is sent to the DU through the downlink tunnel, and is submitted to all RLC entities associated with the MRB simultaneously.

To create a particular PTM delivery instance, there are at least two solutions, differentiated by the information in the signaling sent from the CU to the DU. In the first solution, the signaling contains a cell list which contains the cells where the MBS is scheduled. In the second solution, the signaling contains a UE ID list which contains the UEs assigned to use PTM mode. Each solution is described in detail below.

In the first solution, during the CU decision process, the CU not only determines the delivery mode for the UEs, whether PTP or PTM. The CU further determines which cells under the DU the PTM transmission takes place. Therefore, the CU to DU signaling carries a cell list to instruct PTM transmission. On the DU side, for each cell in the cell list, the DU allocates corresponding PTM resources for the MBS, or denies part of the QoS flows and further denies the creation of the corresponding MRBs. As such, the DU response message contains the MRB creation result for the MBS on a per cell basis. In the event some MRBs failed to be created, the message returns the failed MRBs and the corresponding failure reason.

Optionally, if the signaling carries a list of UEs using PTM mode, the response message from the DU may carry a first logical channel ID (LCID1) for each UE, the LCID identifies the logic channel, which is the primary path, for the UE to send status report. In addition, the DU may further carry a second logical channel ID (LCID2), which is the LCID used by the UE to receive the MRB of the MBS. For example, LCID1 is associated with LCID2, after the UE receives a MAC PDU, the UE submits the data marked LCID1 to the logical channel identified by LCID2 for further processing.

In the second solution, during the CU decision process, the decision may not include information for related cells, but only include each UE and its delivery mode. For example, UE2-PTM, UE3-PTM, UE4-PTM, UE5-PTM. On the DU side, the DU looks up the cells each UE is connected to, then based on the connection status of the UE in the corresponding cell, and the available resources in the cell, the DU chooses the appropriate PTM scheduling parameters flexibly. For example, the DU decides that on cell1, UE2 and UE3 use one PTM instance to receive MBS data, and on cell2, UE4 and UE5 use another PTM instance to receive MBS data. The DU further decides the MAC/PHY configuration for each PTM instance and sends the configuration back to the CU in the response message. In some scenarios, multiple UEs in a cell receive the same MBS. The DU may decide to create multiple PTM instances to serve these UEs. The DU further decides the MAC/PHY configuration for each PTM instance and sends the configuration back to the CU in the response message. The configuration information in this case may be in a list format.

To satisfy the QoS requirement of the MBS, in the CU to DU signaling, there is QoS parameters corresponding to each MRB, as well as QoS parameters of the QoS flow corresponding to the MRB, so DU may allocate appropriate resources based on the QoS parameters.

For a certain MRB, the MRB data is distributed from CU to DU through F1-U tunnel. Depending on how the CU distribute the MRB data, there are two implementations to pass the MRB data.

In the first case, CU uses IP multicast to distribute the MRB data to the DU. The CU to DU signaling carries an IP multicast address and a TEID. The DU may then join the multicast group and receive the MRB data from the tunnel.

In the second case, CU uses point to point protocol to distribute MRB data to DU. In the received the signaling message, based on the MBS ID and its corresponding MRB ID, or other information that can reflect this information, the DU may be able to re-use an existing tunnel. If there is no existing tunnel for the MRB, DU will allocate a downlink IP address and a corresponding TEID, and send these downlink tunnel related information to the CU in the response message. By doing this, for a particular MRB in a MBS session, a single tunnel may be shared by different RLC entities, and there is no need to duplicate PDU data in the PDCP layer.

Embodiment 3

In this embodiment, the various categories of requests and response above related to a PTP delivery instance for a particular UE may be carried using UE-associated signaling message formats whereas the various categories of requests and response above related to a particular PTM delivery instance may be carried using MBS-associated signaling message formats.

In case of the CU makes a decision that some UEs receive the MBS in PTP mode (group 1 UEs), whereas some UEs receive the MBS in the PTM mode (group 2 UEs). For group 1 UEs, the CU uses per UE F1 signaling (or UE-associated signaling), such as UE context setup or UE context modification signaling. For group 2 UEs, the CU uses per MBS F1 signaling (or MBS-associated signaling), such as MBS context setup or MBS context modification signaling. In either case, the CU uses the corresponding F1 signaling to send the decision to the DU and request the DU to allocate corresponding resources. The MBS-associated signaling may apply to one UE or multiple UEs, or one cell or multiple cells.

Upon receiving the request from the CU, the DU tries to allocate resources per the request. The DU then sends response information to the CU to give feedback whether each MRB is created successfully. Furthermore, for each MRB successfully created, the DU creates configuration for the particular MRB and send the configuration back to the CU.

Refer to FIG. 5, the signaling messages are generally referred to as MBS Context Setup or MBS Context Modification, they may be further classified into two kinds of operations, which are per UE F1 message and per MBS F1 message. The contents contained in the above signaling are described separately below.

For group 1 UEs using PTP receiving mode, the CU uses per UE F1 signaling, such as UE context setup or UE context modification signaling. This disclosure extends the current per UE signaling and contains at least one of the parameters in the signaling messages initiated from the CU:
  gNB-CU UE F1AP ID.
  gNB-DU UE F1AP ID (optional).
  MBS session ID.
  MRB ID list containing radio bearers serving the MBS, and optionally, the radio bear ID UE uses during UE side data processing associated with each MRB in the MRB list.
  The QoS parameters of each MRB, and the corresponding QoS parameters of the QoS flow.
  RLC bearer mode (AM or UM) corresponding to the MRB.
  A user plane uplink tunnel address for the UE-associated with the MRB. The user plane uplink tunnel address is used by the UE to perform MBS status report.
  For each RB serving the multicast service, if IP multicast is used at the transport network layer, that is, the UDP/IP layer in the GTP-U protocol stack, the corresponding IP multicast address (with or without source address) and the corresponding TEID.
  CU explicitly enables PDCP status report and/or PDCP PDU retransmission.

Correspondingly, this disclosure extends the current per UE signaling and contains at least one of the parameters in the signaling messages initiated from the DU, these messages may be response messages or autonomous messages:
  gNB-CU UE F1AP ID.
  gNB-DU UE F1AP ID.
  MBS session ID.
  MRB list for MRBs created or modified successfully.
  downlink tunnel information for each MRB.
  MRB list for MRBs failed to be created or modified.
  cell group configuration update for the UE, this may be a DU to CU RRC information.

Similarly, for group 2 UEs using PTM delivery mode, the CU uses per MBS F1 signaling, such as MBS context setup or MBS context modification signaling. This disclosure extends the current per MBS signaling and contains at least one of the parameters in the signaling messages initiated from the CU:
  gNB-CU UE F1AP ID.
  gNB-DU UE F1AP ID (optional).
  MBS session ID.
  MRB ID list containing radio bearers serving the MBS.
  The QoS parameters of each MRB, and the corresponding QoS parameters of the QoS flow.
  A cell list which contains the cells where the MBS is scheduled. Optionally, a corresponding PTM instance ID list for each cell, and UE ID list for each PTM instance.
  A UE ID list which contains UEs using PTM delivery mode. Optionally, a RB ID list, and the mapping RB ID used by the UE for each MRB in the RB ID list.
  Downlink IP multicast address (may or may not include source address) and TED.

The UE ID may be gNB-CU UE F1AP ID or gNB-DU UE F1AP ID, which is used to uniquely identify the UE's logical connection on the F1 interface within the CU or DU. The UE ID may also be a UE group index, which may be used to help DU's subsequent scheduling, such as a judgement on feedback resources.

Correspondingly, this disclosure extends the current per MBS signaling and contains at least one of the parameters in the signaling messages initiated from the DU, these messages may be response messages or autonomous messages:
- gNB-CU UE F1AP ID.
- gNB-DU UE F1AP ID.
- MBS session ID.
- For each UE using PTM mode, its associated cell or cell list, optionally, the corresponding PTM instance ID for each cell.
- A cell list, optionally, for each PTM delivery instance in the cell:
  - A MRB ID list containing MRBs accepted by the DU to serve the MBS, another MRB list containing MRBs rejected by the DU.
  - The corresponding MAC/PHY configuration for each MRB.
- Optionally, feedback configuration for each UE.
- Optionally, for each accepted MRB, its corresponding F1-U tunnel information including: downlink IP address and TEID.
- LCID configuration for each UE.

Embodiment 3 Exemplary Implementation

In this embodiment, the CU decides that for a MBS group, some UEs use PTP deliver mode (group 1 UE) and some UEs use PTM deliver mode (group 2 UE). The CU uses different signaling type for different group of UE, that is, using per UE signaling for group 1 UE and using per MBS signaling for group 2 UE.

The CU first decides that UE1 receives the MBS in PTP mode, then the CU creates the corresponding per UE F1 signaling and sends the signaling to the DU. The specific process is described below. The information elements are listed in both request messages and response messages with detailed explanation.

gNB-CU UE F1AP ID, Optionally, gNB-DU UE F1AP ID

The per UE context setup/modification signaling initiated from the CU is identified by gNB-CU UE F1AP ID. This ID indicates the signaling is per UE type, and targets UE1 receiving the MBS in PTP mode. Accordingly, the corresponding DU response message carries gNB-CU UE F1AP ID and gNB-DU UE F1AP ID, the gNB-DU UE F1AP ID is used to uniquely identify the UE's logical connection on the F1 interface within the DU.

In some scenarios, for a MRB serving a MBS, the MRB ID name space on the network side is independent with the RB ID name space used by the UE on the UE side for the UE's other PDU sessions. As such, the MBS session ID combined with the MRB ID may be used to uniquely identify the MRB for this MBS. In some scenarios, DU can use the aforementioned combination of the MBS session ID and the MRB ID from the F1 signaling to allocate only one downlink tunnel address which is mapped to only one F1-U tunnel for a particular MRB, thus save the transport resources between CU and DU.

In some scenarios, for a MRB serving a MBS, the MRB ID name space on the network side shared the same RB ID name space used by the UE on the UE side for the UE's other PDU sessions. As such, the F1 signaling does not need to carry the MBS session ID, the MRB ID itself may be used to uniquely identify the MRB for this MBS. In some other scenarios, the F1 signaling still needs to carry the MBS session ID, DU can use the combination of the MBS session ID and the MRB ID from the F1 signaling to allocate only one downlink tunnel address which is mapped to a unique F1-U tunnel, thus save the transport resources between CU and DU.

MRB List Containing MRBs Need to be Created or Modified

The MRB list may list all or just some of the MRBs serving the MBS. If the F1 signaling to instruct UE delivery mode switch is based on per service granularity, then the signaling applies to all the MRBs for the MBS. In this case, the signaling message may carry all the MRBs, or just the MBS ID.

For each of the MRB in the MRB list, additional information is carried in the message:
- MRB ID. In some scenarios, the MRB ID (RBID1) of each MRB is associated with the second RB ID (RBID2) which is used by the UE to process PDUs. Subsequently, when DU configuring RLC bearer, the DU set the corresponding served radio bearer to RBID2.
- QoS parameters for each MRB, and the corresponding QoS flow level QoS parameters. DU needs to use these parameters to perform MRB scheduling.
- Notification control configuration. If the notification control corresponding to the MRB is active, the DU may notify the CU whether the MRB's transmission and reception requirement is met, based on UE feedback or measurement report, so that the CU can further decide if UE delivery mode switch is needed.
- Corresponding RLC mode—Base on the MBS characteristics, the RLC entity associated with the MRB is configured to be AM mode or UM mode. For example, if the QoS requirement for the corresponding MRB is not sensitive to time delay but requires high reliability, then the corresponding RLC instance may be set to AM mode; on the other hand if the QoS requirement for the corresponding RB is sensitive to time, then the corresponding RLC instance may be set to UM mode.
- UE user plane uplink tunnel address corresponding to the MRB associated with the UE. If the RB is configured to perform PDCP status report, then the CU needs to assign this uplink tunnel address, so the peer PDCP instance on the UE side can provide feedback. In this case, the signaling message needs to carry the uplink tunnel address corresponding to the MRB.
- Downlink tunnel information (IP multicast)—if the MRB is distributed from CU to DU using IP multicast, then the CU need to provide an IP multicast address together with its corresponding Tunnel End ID (TED) for the MRB and adds the information in the F1 signaling message. The DU can then join the IP multicast group to receive the downlink data.
- In some scenarios, for a particular MRB, multiple UEs receiving the MBS can share a downlink tunnel on the F1-U link, regardless of the delivery mode (PTP or PTM) of the UEs. The downlink tunnel maps to the same IP multicast address and TEID. In other scenarios, UEs receiving the MRB using PTP mode and UEs receiving the MRS using PTM mode use independent downlink tunnel on the F1-U link, the downlink tunnel maps to different IP multicast addresses and TEIDs.
- Now refer to FIG. 8. In some scenarios, CU explicitly enable PDCP status report and/or PDCP PDU retransmission, or the retransmission mechanism is default setting. The DU needs to return corresponding downlink tunnel information, which is tunnel 2 as shown in FIG. 8. DU further creates corresponding RLC entity 2 configuration and the associated LCID information, the logical channel identified by the LCID corresponds to the primary RLC associated with the MRB on the UE side, and is used as primary path to transmit PDCP status report for this MRB.

Downlink tunnel information (IP point to point)—If the DU accepts the creation or modification of the MRB, and the MRB is distributed from CU to DU using point to point protocol, then the DU returns downlink tunnel information corresponding to the MRB. In some scenarios, based on the MBS ID and the corresponding MRB ID in the F1 signaling message sent from the CU, DU is able to identify a shared downlink tunnel to serve the particular MRB, thus saves resources on the F1-U link. In this case, DU may return the information for the existing tunnel, which includes IP address and TEID.

Now refer to FIG. 8. In some scenarios, CU explicitly enable PDCP status report and/or PDCP PDU retransmission, or the retransmission mechanism is default setting. Then DU may return information for two user plane downlink tunnels, tunnel 1 and tunnel 2 as shown in FIG. 8. Tunnel 1 is used to transport MRB data and it may be shared by other UEs. Tunnel 2 is for MRB data retransmission. At the same time, DU creates corresponding RLC entity 2 configuration. RLC entity 2 is used to receive PDCP PDU from the CU and then transmit the PDU data to UE1 in PTP mode. Or it can be used for PDCP layer data retransmission. The response message from the DU may carry corresponding logical channel ID (LCD) information, the LCID identifies the logic channel, which corresponds to the primary RLC on the UE side to send PDCP status report. After receiving the PDCP PDU corresponding to the MRB from the shared tunnel 1, the DU submits the MRB data to at least RLC entity 1 and RLC entity 2 to serve different UEs. In some scenarios, DU only return information for one user plane downlink tunnel, the initial MRB data transmission and possible retransmission by the CU occurs in this same tunnel.

If DU does not accept the MRB, then DU will return a MRB list containing MRBs failed to be created or modified in the response message. In this case, tunnel information may not apply.

The CU then decides that UE2 to UE10 receive the MBS in PTM mode and creates the corresponding per MBS F1 signaling and sends the signaling to the DU so the DU can create MBS session context and allocate corresponding resources for the PTM instance. The specific process is described below. The information elements are listed in both request messages and response messages.

gNB-CU MBS F1AP ID and gNB-DU MBS F1AP ID

The CU signaling message at least carries the gNB-CU MBS F1AP ID to uniquely identify the MBS session within CU over the F1 interface. Similarly, DU returns gNB-CU MBS F1AP ID and gNB-DU MBS F1AP ID information in the response message, to be used to uniquely identify the MBS session within DU over the F1 interface.

(Mbs Identifier)

The MBS Identifier may be one of the following:
TMGI (Temporary Mobile Group Identity).
IP multicast address (with or without source address).
MBS ID.
Any other identifier or index that can uniquely identify the MBS over the F1 interface.

In some scenarios, for a MRB serving a MBS, the MRB ID name space on the network side is independent with the RB ID name space used by the UE on the UE side for the UE's other PDU sessions. As such, the MBS session ID combined with the MRB ID may be used to uniquely identify the MRB for this MBS. In some scenarios, DU can use the aforementioned combination of the MBS session ID and the MRB ID from the F1 signaling to allocate only one downlink tunnel address which is mapped to only one F1-U tunnel for a particular MRB, thus save the transport resources between CU and DU.

In some scenarios, for a particular MRB, the transport of the MRB data from CU to DU share a downlink tunnel. DU received the MRB data from the shared tunnel and then submits the data to multiple RLC entities. These RLC entities correspond to different PTP and PTM instances.

MRB List

The MRB list contains MRBs need to be created or modified. For each of the MRB in the list, additional information is carried in the message:

MRB ID. In some scenarios, the MRB ID (RBID1) of each MRB is associated with the second RB ID (RBID2) which is used by the UE to process PDUs. Subsequently, when DU configuring RLC bearer, the DU set the corresponding served radio bearer to RBID2.

QoS parameters for each MRB, and the corresponding QoS flow level QoS parameters. DU needs to use these parameters to perform MRB scheduling.

Notification control configuration. If the notification control corresponding to the MRB is active, the DU may notify the CU whether the MRB's transmission and reception requirement is met, based on UE feedback or measurement report, so that the CU can further decide if UE delivery mode switch is needed.

Corresponding RLC entity mode (optional). For a MBS session, the default mode is UM.

Downlink tunnel information (IP multicast)—if the MRB is distributed from CU to DU using IP multicast, then the CU need to provide an IP multicast address together with its corresponding Tunnel End ID (TED) for the MRB and adds the information in the F1 signaling message. If the DU accepts the MRB, then the DU can join the IP multicast group to receive the downlink data.

Cell Information

There are two solutions for the CU to carry cell list, each solution is listed below.

Solution A:

The F1 signaling message contains a cell list which contains the cells scheduled by the MBS, optionally, the PTM delivery instance list under each cell, optionally, the corresponding UE ID list.

During the CU decision process, the CU not only determines the delivery mode for the UEs, whether PTP or PTM, the CU further determines which cells under the DU the PTM transmission takes place. Optionally, the PTM delivery instance under the cells. For example, CU decides UE1 uses PTP mode in cell1, UE2 and UE3 use PTM mode in cell1, UE4 and UE5 use PTM mode in cell2. CU signaling message carries a cell list under the DU. Correspondingly, after receiving the message, DU allocates PTM resources for the MBS in each cell, or deny the creation or modification of some or all of the MRB for the MBS.

The DU response message contains the MRB creation result for the MBS on a per cell basis. Optionally, the DU response message carries every PTM delivery instance under each cell, and its PTM resource allocation result, which includes RLC entity configuration and corresponding MAC/PHY configuration. If the CU signaling message contains a UE ID list, then DU may provide UE specific RLC entity configuration. If the CU signaling message further contains a UE ID list for each PTM delivery instance, then optionally, CU messages contains a mapping from every MRB of the MBS (RBID1) to RBID2, wherein RBID2 is the radio bearer ID the UE uses when processing PDCP PDU. Additionally, in the RLC bearer configuration created by the DU for the UE, the served radio bearer field in the RLC bearer configuration is set to RBID2, by the DU.

In some scenarios, the CU does not specify the PTM delivery instance ID in the transmission cell, rather the DU carries the PTM delivery instance information and optionally the associated UE list, in the response message. Refer to FIG. 4, CU decides that UE6 to UE10 using PTM mode under cell3, DU further decides UE6, UE7, and UE8 use PTM delivery instance 3 (PTM3), UE9 and UE10 use PTM delivery instance 4 (PTM4).

Solution B:

The F1 signaling message contains a UE ID list which contains the UEs using PTM mode.

The CU message does not specify the cell information, and only contains UE ID and its corresponding delivery mode. For example, refer to FIG. 4, UE2 to UE10 all use PTM mode to receive MBS. On the DU side, based on each UE's connection status and its capability, the DU allocated PTM delivery cell for the UE. Optionally, the PTM delivery instance in the PTM delivery cell. In some embodiments, based on the connection status context of each UE in each cell, as well as the available resource in each cell, the DU schedules PTM scheduling parameters flexibly. As such, the decision by the DU is more efficient sometime.

In some scenarios, the DU may implement multiple PTM delivery instances in a cell for UEs in a same MBS group, and allocates corresponding MAC/PHY configuration. The DU sends the configuration to the CU on a per cell basis, that is, for each cell, DU returns a MAC/PHY configurations list. The above scheduling result may be included in DU to CU information and sent to CU. In some scenarios, the above configuration, together with corresponding MRB configuration, is broadcasted in the corresponding cell, so the information may be sent to the UE.

For example, refer to FIG. 4, the DU decides UE2 and UE3 use delivery instances PTM1 under cell1, UE4 and UE5 use delivery instances PTM2 under cell 2, whereas (UE6, UE7, UE8) and (UE9, UE10) use different delivery instances, PTM3 and PTM4, under cell 3. The DU further chooses MAC/PHY configurations corresponding to each PTM delivery instance, and adds the configuration information to the response message, and sends the response message to the CU either per cell, or per PTM instance in the cell.

Base on the UE ID list, then DU may provide UE specific RLC entity configuration which includes RLC bearer configuration. If the CU signaling message further contains a UE ID list for each PTM delivery instance, then optionally, the CU message contains a mapping from every MRB of the MBS (RBID1) to RBID2, wherein RBID2 is the radio bearer ID the UE uses when processing PDCP PDU. Additionally, in the RLC bearer configuration created by the DU for the UE, the served radio bearer field in the RLC bearer configuration is set to RBID2, by the DU.

If the MRB is distributed from the CU to the DU using IP multicast, and for different PTP and PTM delivery instances, the MRB transport shares the same F1-U downlink tunnel, then the CU needs to provide an IP multicast address together with its corresponding TEID for the MRB and adds the information in the F1 signaling message. The DU can then join the IP multicast group to receive the downlink data.

If the MRB is distributed from the CU to the DU using point to point protocol, then on the DU side, based on the MBS ID in the F1 signaling message, and the corresponding MRB ID, the DU may reuse the pre-established tunnel, including its IP address and TEID information. For a certain MRB in a MBS, different cells, or different PTM delivery instances in the same cell, may share a single tunnel between the CU and the DU.

The UE ID in the UE ID list may be gNB-CU UE F1AP ID or gNB-DU UE F1AP ID, which is used to uniquely identify the UE's logical connection on the F1 interface within the CU or DU. The UE ID may also be a UE group index, which may be used to help DU's subsequent scheduling, such as a judgement on feedback resources. In some scenarios, CU message may only contain UE group index or UE index, in the subsequent air interface resource allocation, the DU may use the UE index to uniquely identify the HARQ or CSI-RS feedback resource for the UE.

In some embodiments, the per UE signaling message may only be used to notify DU that the UE needs to join a MBS group, the MBS group may be implicitly identified by service information such as MBS session ID in the message. The subsequent MBS management may be achieved by using per MBS signaling conversation. Such MBS management includes DRB update and QoS related information update.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless resource allocation, performed by a first access network node (ANN) in communication with a second ANN in an access network of a wireless communication network, the method comprising:
    performing a first resource allocation of at least one radio bearer (RB) for an MBS session by mapping quality of service (QoS) flows of the MBS session having various QoS levels to the at least one RB, the MBS session targeting a set of user equipments (UEs) served by the second ANN;
    dividing the set of UEs into a first subset and second subset of UEs for receiving the MBS session data from the second ANN over an air interface in a point-to-point (PTP) mode and a point-to-multipoint (PTM) mode, respectively, or receiving the division from the second ANN;
    transmitting, to the second ANN, according to a predetermined signaling message format, one or more signaling messages each comprising an identifier for the MBS session to cause the second ANN to perform an establishment, a modification, or a release of a second resource allocation and configuration for the MBS session; and
    receiving one or more response messages based on the predetermined signaling message format from the second ANN.

2. The method of claim 1, wherein the first ANN comprises a gNB-Central Unit (CU) and the second ANN comprises a gNB-Distributed Unit (DU).

3. The method of claim 1, wherein each of the one or more signaling message or the one or more response messages comprises one of:
    a context setup request message; or
    a context modification request message.

4. The method of claim 1, further comprising:
    interactively managing, with the second ANN, a plurality of MBS session delivery instances,
    wherein the plurality of the MBS session delivery instances comprise a set of PTP delivery instances each corresponding to one of the first subset of UEs and one or more PTM delivery instances each corresponds to at least one UE of the second subset of UEs.

5. The method of claim 4, wherein each of the one or more signaling messages belongs to a single procedure code space of control information exchange between the first ANN and the second ANN.

6. The method of claim 5, wherein each of the one or more signaling messages comprises a UE-associated signaling.

7. The method of claim 6, wherein the first ANN processes the one or more signaling messages accumulatively to enable the second ANN to establish or modify a particular PTM delivery instance and to identify UEs belonging to the particular PTM delivery instance.

8. The method of claim 6, wherein each of the one or more signaling messages further comprises a mode indicator indicating whether a target UE is to receive the MBS session in the PTP mode or in the PTM mode.

9. The method of claim 1, wherein the first subset of UEs and the second subset of UEs overlap.

10. A computer program product comprising a non-transitory computer-readable program medium with computer code stored thereupon, the computer code, when executed by one or more processors, causing the one or more processors to implement a method claim 1.

11. A method for wireless resource allocation, performed by a first access network node (ANN) and a second ANN in an access network of a wireless communication network, the method comprising:
    receiving, by the first ANN, a context information of a multicast/broadcast service (MBS) session from a core network;
    allocating, by the first ANN, at least one radio bearers (RB) for the MBS session by mapping quality of service (QoS) flows of the MBS session having various QoS levels to the at least one RB;
    identifying, by the first ANN, a set of user equipments (UEs) targeted by the MBS session and served by the second ANN; and
    dividing, by the first ANN or the second ANN, the set of UEs into a first subset and second subset of UEs for receiving the MBS session from the second ANN over an air interface in a point-to-point (PTP) mode and a point-to-multipoint (PTM) mode, respectively.

12. The method of claim 11, wherein except for the PHY resource, the resource allocations for one of the one or more PTP or PTM delivery instances each comprises protocol stack layer entities or tunnels, from higher layer to lower layer, in the order of the processing of downlink data packet, at least one:
    PDCP entity;
    F1-U tunnel; and
    RLC entity.

13. The method of claim 12, wherein the two delivery instances share the F1-U tunnel and other entities higher than the F1-U tunnel and comprise separate entities lower than the F-U tunnel.

14. The method of claim 12, wherein the two delivery instances share the PDCP entity and all entities higher than the PDCP entity, and comprise separate entities lower than the PDCP entity.

15. A device comprising a memory for storing computer instructions and a processor in communication with the memory, wherein the processor, when executing the computer instructions, is configured to implement a method of claim 11.

16. A computer program product comprising a non-transitory computer-readable program medium with computer code stored thereupon, the computer code, when executed by one or more processors, causing the one or more processors to implement a method of claim 11.

17. A first access network node (ANN) in communication with a second ANN, the first ANN comprising a memory for storing computer instructions and a processor in communication with the memory, wherein, when the processor executes the computer instructions, the processor is configured to cause the first ANN to:
    perform a first resource allocation of at least one radio bearer (RB) for an MBS session by mapping quality of service (QoS) flows of the MBS session having various QoS levels to the at least one RB, the MBS session targeting a set of user equipments (UEs) served by the second ANN;

divide the set of UEs into a first subset and second subset of UEs for receiving the MBS session data from the second ANN over an air interface in a point-to-point (PTP) mode and a point-to-multipoint (PTM) mode, respectively, or receiving the division from the second ANN;

transmit, to the second ANN, according to a predetermined signaling message format, one or more signaling messages each comprising an identifier for the MBS session to cause the second ANN to perform an establishment, a modification, or a release of a second resource allocation and configuration for the MBS session; and receive one or more response messages based on the predetermined signaling message format from the second ANN.

18. The first ANN of claim 17, wherein the first ANN comprises a gNB-Central Unit (CU) and the second ANN comprises a gNB-Distributed Unit (DU).

* * * * *